(12) United States Patent
Asthana et al.

(10) Patent No.: US 10,673,775 B2
(45) Date of Patent: Jun. 2, 2020

(54) ORCHESTRATION ENGINE USING A BLOCKCHAIN FOR A CLOUD RESOURCE DIGITAL LEDGER

(71) Applicant: International Business Machines Corporation, Armonk, NY (US)

(72) Inventors: Neeraj Asthana, Acton, MA (US); Thomas E. Chefalas, Somers, NY (US); Alexei Karve, Mohegan Lake, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

(21) Appl. No.: 15/906,426

(22) Filed: Feb. 27, 2018

(65) Prior Publication Data

US 2019/0268277 A1    Aug. 29, 2019

(51) Int. Cl.
*H04L 12/911* (2013.01)
*G06N 20/00* (2019.01)
*H04L 29/08* (2006.01)

(52) U.S. Cl.
CPC ............. *H04L 47/70* (2013.01); *G06N 20/00* (2019.01); *H04L 67/10* (2013.01)

(58) Field of Classification Search
None
See application file for complete search history.

(56) References Cited

U.S. PATENT DOCUMENTS

| | | | |
|---|---|---|---|
| 2011/0213686 A1 | 9/2011 | Ferris et al. | |
| 2012/0226808 A1 | 9/2012 | Morgan | |
| 2012/0311157 A1 | 12/2012 | Erickson et al. | |
| 2014/0324647 A1* | 10/2014 | Iyoob | G06Q 40/12 705/30 |
| 2017/0180211 A1* | 6/2017 | Johnson | H04L 41/5009 |
| 2017/0329980 A1* | 11/2017 | Hu | G06F 21/606 |
| 2018/0329693 A1* | 11/2018 | Eksten | G06F 16/21 |
| 2019/0004789 A1* | 1/2019 | Mills | G06F 8/36 |

OTHER PUBLICATIONS

Schiavo, et al., "FaaS: Federation-as-a-Service The SUNFISH Cloud Federation Solution," Last Accessed: Jan. 19, 2018, 56 pages.

(Continued)

*Primary Examiner* — Abdullahi E Salad
*Assistant Examiner* — Hassan A Khan
(74) *Attorney, Agent, or Firm* — Amin, Turocy & Watson, LLP

(57) ABSTRACT

Techniques that facilitate an orchestration engine using a blockchain for a cloud resource digital ledger are provided. In one example, a system includes an orchestration engine component and a blockchain component. The orchestration engine component manages one or more computing resources for a cloud-based computing platform. The blockchain component adds event data indicative of an event associated with the one or more computing resources into a blockchain dataset for the cloud-based computing platform. The blockchain dataset comprises a sequence of data blocks that corresponds to a sequence of events for the cloud-based computing platform.

25 Claims, 13 Drawing Sheets

(56) References Cited

OTHER PUBLICATIONS

Prybila, et al., "Runtime Verification for Business Processes Utilizing the Bitcoin Blockchain," arXiv:1706.04404v2 [cs.SE] Aug. 18, 2017, 18 pages.
Cao, et al., "Providing Virtual Cloud for Special Purposes on Demand in JointCloud Computing Environment," Journal of Computer Science and Technology 32(2): 211-218 Mar. 2017. DOI 10.1007/s11390-017-1715-1.
Wang, et al., "JointCloud: A Cross-Cloud Cooperation Architecture for Integrated Internet Service Customization," 2017 IEEE 37th International Conference on Distributed Computing Systems, 10 pages.
Brakeville, et al., "Blockchain basics: Introduction to distributed ledgers," Published on May 9, 2016, 8 pages.
hyperledger.org, "Hyperledger—Blockchain Technologies for Business," Retrieved: Dec. 11, 2017, 5 pages.
docs.oracle.com, "Enterprise Manager Cloud Administration Guide," 57 Introduction to Blueprints, Retrieved: Dec. 11, 2017, 16 pages.
m.veryicon.com, "It Infrastructure Nas Icon," Retrieved: Dec. 11, 2017, 4 pages.
deloitte.com, "SDG #7: Ensure access to affordable, reliable, sustainable and modern energy | Strategic Risk," Retrieved: Dec. 11, 2017, 2 pages.
Schmidt, et al., "Unibyte—a unified framework for blockchain based business integration," Oct. 24, 2017, 28 pages.
docs.vmware.com, "VMware vRealize Automation," Retrieved: Dec. 11, 2017, 3 pages.

\* cited by examiner

ORCHESTRATION ENGINE USING A BLOCKCHAIN FOR A CLOUD RESOURCE DIGITAL LEDGER

BACKGROUND

The subject disclosure relates to cloud computing systems, and more specifically, to computing resources for cloud computing systems. An orchestration engine can manage computing resources and/or workflows in a cloud computing environment. Generally, an orchestration engine can manage computing resources such as, for example, infrastructure computing resources, virtual machine computing resources, hardware computing resources, software application computing resources, etc. For instance, Ferris et al. (U.S. Patent Publication No. 2011/0213686) discloses that "a resource tracking module associated with the cloud network can track the actual amount of resources operated by the end users in executing applications associated with the ISV. The resource tracking module can compare the actual amount to the amount specified in the SaaS, and adjust the resources of the cloud network accordingly. In embodiments, the SaaS can be updated based on the adjustment." Furthermore, Morgan (U.S. Patent Publication No. 2012/0226808) discloses that "a set of aggregate usage history data can record consumption of processor, software, or other resources subscribed to by a set of users, in one cloud or across multiple clouds. An entitlement engine can analyze the usage history data to identify a subscription margin for the subscribed resources, reflecting collective under-consumption of resources by the set of users on a collective basis, over different and/or dynamically updated subscription periods. In aspects, the entitlement engine or other logic can generate multiple hierarchical time periods or layers over which resource consumption can be tracked." However, with an orchestration engine employed today, it is generally difficult and/or inefficient to maintain a common view of managed computing resources for the cloud computing environment. For example, multiple parties generally cannot accurately gather information about an infrastructure and/or services due to centralized mechanisms and/or propriety persistence mechanisms of transactions in a cloud computing environment. Moreover, with an orchestration engine employed today, it is generally difficult to manage and/or share a resource state for operating system requirements, memory requirements, processing requirements and/or other requirements for a cloud computing environment across multiple parties due to, for example, separate and proprietary persistence mechanisms. Therefore, an improved orchestration engine is needed.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate an orchestration engine using a blockchain for a cloud resource digital ledger are described.

According to an embodiment, a system can comprise an orchestration engine component and a blockchain component. The orchestration engine component can manage one or more computing resources for a cloud-based computing platform. The blockchain component can add event data indicative of an event associated with the one or more computing resources into a blockchain dataset for the cloud-based computing platform. The blockchain dataset can comprises a sequence of data blocks that corresponds to a sequence of events for the cloud-based computing platform. In an embodiment, the system can provide improved management of one or more computing resource requirements for a cloud-based computing platform. In certain embodiments, the first block of the blockchain dataset can be associated with a provisioning event of a particular computing resource, a particular workload, a grouping of computing resources, or a particular customer identity associated with the cloud-based computing platform. In an embodiment, the blockchain component can add the event data into the blockchain dataset in response to a determination that the event data satisfies a defined criterion associated with a risk level. In another embodiment, the blockchain component can vary a rate for adding the event data into the blockchain dataset based on risk level data indicative of a risk level associated with the cloud-based computing platform during a defined period of time. In yet another embodiment, the blockchain component can format the event data as a combination of a plurality of events associated with the one or more computing resources. In certain embodiments, the orchestration engine component can manage at least one computing resource for a cloud provider device associated with the cloud-based computing platform. In certain embodiments, the cloud-based computing platform can be a hybrid cloud-based computing platform, a public cloud-based computing platform, or a private cloud-based computing platform. In certain embodiments, the orchestration engine component can determine the one or more computing resources based on a blueprint, and wherein the blueprint is indicative of a machine-readable representation of the one or more computing resources. In certain embodiments, the blockchain component can add the event data into the blockchain dataset to facilitate improved performance for the cloud-based computing platform.

According to another embodiment, a computer-implemented method is provided. The computer-implemented method can comprise identifying, by a system operatively coupled to a processor, one or more blueprint-level aspects from a blueprint associated with information for one or more computing resources of a cloud-based computing platform. The computer-implemented method can also comprise adding, by the system, first event data indicative of a first event associated with the one or more computing resources into a first data block of a blockchain dataset for the cloud-based computing platform. Furthermore, the computer-implemented method can comprise adding, by the system, second event data indicative of a second event associated with the one or more computing resources into a second data block of the blockchain dataset for the cloud-based computing platform. In an embodiment, the computer-implemented method can provide improved management of one or more computing resource requirements for a cloud-based computing platform. In certain embodiments, the adding the first event data into the first data block of the blockchain dataset can comprise adding information associated with a provisioning event of a particular computing resource, a particular workload, a grouping of computing resources, or a particular customer identity into the first data block. In an embodiment, the adding the first event data into the first data block can comprise adding the first event data into the first data block of the blockchain dataset in response to a determination that the first event data satisfies a defined criterion associated with a risk level. In another embodiment, the adding the first event data into the first data block can comprise adding the first event data into the first data block of the blockchain dataset based on a risk level associated with the cloud-based computing platform during a defined period of time. In yet another embodiment, the adding the first event data into the first data block can comprise formatting the first event data as a combination of a plurality of events associated with the one or more computing resources. In certain embodiments, the computer-implemented method can comprise managing, by the system, at least one computing resource for a cloud provider device associated with the cloud-based computing platform. In certain embodiments, the computer-implemented method can comprise determining, by the system, the one or more computing resources based on a blueprint that is indicative of a machine-readable representation of the one or more computing resources. In certain embodiments, the adding the first event data into the first data block can comprise improving performance of the cloud-based computing platform.

According to yet another embodiment, a computer program product for facilitating an orchestration engine process associated with a blockchain can comprise a computer readable storage medium having program instructions embodied therewith. The program instructions can be executable by a processor and cause the processor to monitor, by the processor, one or more computing resources of a cloud-based computing platform. The program instructions can also cause the processor to add, by the processor, first event data indicative of a first event associated with the one or more computing resources into a first data block of a blockchain dataset for the cloud-based computing platform. Furthermore, the program instructions can cause the processor to add, by the processor, second event data indicative of a second event associated with the one or more computing resources into a second data block of the blockchain dataset for the cloud-based computing platform. In an embodiment, the computer program product can provide improved management of one or more computing resource requirements for a cloud-based computing platform. In certain embodiments, the program instructions can also cause the processor to add, by the processor, the first event data into the first data block of the blockchain dataset in response to a determination that the first event data satisfies a defined criterion associated with a risk level. In certain embodiments, the program instructions can also cause the processor to determine, by the processor, the one or more computing resources based on a blueprint that is indicative of a machine-readable representation of the one or more computing resources.

According to yet another embodiment, a system can comprise a learning component, an orchestration engine component and a blockchain component. The learning component can monitor a cloud-based computing platform to learn one or more features associated with the cloud-based computing platform. The orchestration engine component can determine one or more computing resources for a cloud-based computing platform based on a blueprint associated with the cloud-based computing platform. The blueprint can be indicative of a machine-readable representation of the one or more computing resources. The blockchain component can add event data indicative of an event associated with the one or more computing resources into a blockchain dataset for the cloud-based computing platform. The blockchain dataset can comprise a sequence of data blocks that corresponds to a sequence of events for the cloud-based computing platform. In an embodiment, the system can provide improved management of one or more computing resource requirements for a cloud-based computing platform. In certain embodiments, the learning component can learn the one or more features associated with the cloud-based computing platform based on a machine learning process According to yet another embodiment, a computer-implemented method is provided. The computer-implemented method can comprise determining, by a system operatively coupled to a processor, one or more computing resources of a cloud-based computing platform based on a blueprint indicative of a machine-readable representation of the one or more computing resources. The computer-implemented method can also comprise adding, by the system, first event data indicative of a first event associated with the one or more computing resources into a first data block of a blockchain dataset for the cloud-based computing platform. Furthermore, the computer-implemented method can comprise adding, by the system, second event data indicative of a second event associated with the one or more computing resources into a second data block of the blockchain dataset for the cloud-based computing platform. In an embodiment, the computer-implemented method can provide improved management of one or more computing resource requirements for a cloud-based computing platform. In certain embodiments, the adding the second event data into the second data block can comprise adding the second event data into the second data block of the blockchain dataset in response to a determination that the second event data satisfies a defined criterion associated with a risk level. In certain embodiments, the adding the second event data into the second data block can comprise adding the second event data into the second data block of the blockchain dataset based on a risk level associated with the cloud-based computing platform during a defined period of time.

DETAILED DESCRIPTION

Figure 1:
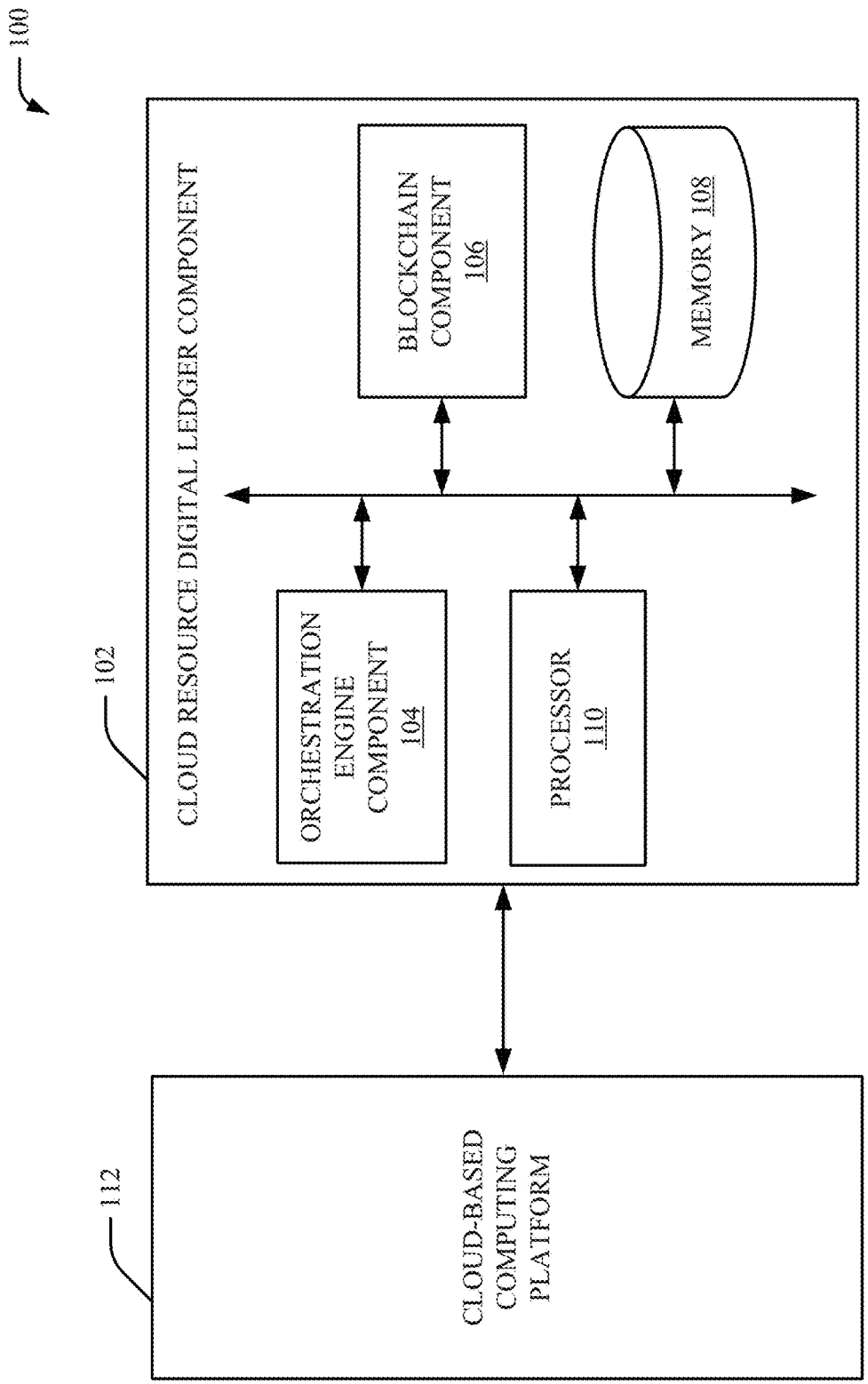
FIG. 1 illustrates a block diagram of an example, non-limiting system that includes a cloud resource digital ledger component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

An orchestration engine can manage computing resources and/or workflows in a cloud computing environment. For instance, an orchestration engine can create, modify, configure and/or delete computing resources such as, for example, infrastructure computing resources, virtual machine computing resources, hardware computing resources, software application computing resources, etc. However, with an orchestration engine employed today, it is generally difficult and/or inefficient to maintain a common view of managed computing resources for the cloud computing environment. For example, multiple parties generally cannot accurately gather information about an infrastructure and/or services due to centralized mechanisms and/or propriety persistence mechanisms of transactions in a cloud computing environment. Moreover, with an orchestration engine employed today, it is generally difficult to manage and/or share a resource state for operating system requirements, memory requirements, processing requirements and/or other requirements for a cloud computing environment across multiple parties due to, for example, separate and proprietary persistence mechanisms. Therefore, an improved orchestration engine is needed.

To address these and/or other issues, embodiments described herein include systems, computer-implemented methods, and computer program products that facilitate an orchestration engine using a blockchain for a cloud resource digital ledger. In an embodiment, an orchestration engine can manipulate and/or compose one or more computing resources associated with a cloud-based computing platform. The one or more computing resources can be computing resources for a virtual machine, storage, middleware, other hardware and/or other software. One or more events associated with the management of the one or more computing resources can be added into a blockchain. For instance, event data indicative of an event associated with a contract transaction (e.g., a smart contract transaction) between the one or more computing resources can be added into the blockchain. The one or more events can include, for example, one or more requests associated with the cloud-based computing platform, one or more changes associated with the cloud-based computing platform, one or more controls associated with the cloud-based computing platform, one or more updates associated with the cloud-based computing platform, and/or one or more other events associated with the cloud-based computing platform. For example, an event can include adding a service to computing resource (e.g., a virtual machine) associated with the cloud-based computing platform, monitoring a computing resource associated with the cloud-based computing platform, backing up a computing resource associated with the cloud-based computing platform, adding a patch to the cloud-based computing platform, performing a security process associated with the cloud-based computing platform, deleting a computing resource associated with the cloud-based computing platform, updating a computing resource associated with the cloud-based computing platform, invoking an application programming interface associated with the cloud-based computing platform, etc. The blockchain can be a sequence of data blocks that corresponds to a sequence of the one or more events for the cloud-based computing platform. In an aspect, the one or more events can be added to the blockchain based on risk management associated with the cloud-based computing platform and/or one or more other factors associated with the cloud-based computing platform. In another aspect, a type of event added to the blockchain and/or a rating for adding the one or more events to the blockchain can be dynamically altered and/or controlled. In an embodiment, multiple parties can be involved for multiple resources within a blueprint. One or more events associated with the multiple parties and/or the multiple resources can be determined for the blueprint. Additionally or alternatively, One or more events associated with the multiple parties and/or the multiple resources can be managed through one or more contract transactions (e.g., one or more smart contract transactions) that are persisted in a blockchain ledger. Therefore, the multiple parties can obtain a consistent view of a cloud-based computing platform (e.g., a computing platform environment requested by a customer).

Moreover, security, accountability, transparency, consistency, trust, and/or immutability of the cloud-based computing platform can be improved by employing one or more embodiments described herein. Management of one or more computing resource requirements for a cloud-based environment (e.g., a cloud-based computing platform) can also be improved. For instance, exchange of event information for the cloud-based environment can be improved, control of information and/or transaction associated with the cloud-based environment can be improved, quality of data obtained from the cloud-based environment can be improved, durability and reliability of data obtained from the cloud-based environment can be improved, transaction integrity associated with the cloud-based environment can be improved, transparency of changes associated with the cloud-based environment can be improved, simplification of transactions associated with the cloud-based environment can be provided, speed of transactions associated with the cloud-based environment can be improved, and/or a cost of transactions associated with the cloud-based environment can be reduced. Furthermore, operating system requirements, memory requirements, processing requirements and/or other requirements for a cloud-based environment (e.g., a cloud-based computing platform) can be efficiently managed. Additionally, efficiency and/or performance of a cloud-based environment (e.g., a cloud-based computing platform) can be improved. For instance, efficiency and/or performance of hardware and/or software included in a cloud-based environment (e.g., a cloud-based computing platform) can be improved.

FIG. 1 illustrates a block diagram of an example, non-limiting system 100 that facilitates an orchestration engine using a blockchain for a cloud resource digital ledger in accordance with one or more embodiments described herein. In various embodiments, the system 100 can be an orchestration engine system associated with technologies such as, but not limited to, cloud computing technologies, computer technologies, server technologies, information technologies, machine learning technologies, artificial intelligence technologies, digital technologies, data analysis technologies, and/or other computer technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with cloud resource digital ledger component, etc.) for carrying out defined tasks related to machine learning. The system 100 and/or components of the system can be employed to solve new problems that arise through advancements in technologies mentioned above, employment of cloud-computing systems, and/or computer architecture, and the like. One or more embodiments of the system 100 can provide technical improvements to cloud computing systems, computer systems, server systems, information technology systems, machine learning systems, artificial intelligence systems, digital systems, data analysis systems, and/or other systems. One or more embodiments of the system 100 can also provide technical improvements to a processing unit (e.g., a processor) associated with an orchestration engine process by improving processing performance of the processing unit, improving processing efficiency of the processing unit, and/or reducing an amount of time for the processing unit to perform a patch management process. One or more embodiments of the system 100 can also provide technical improvements to a cloud computing environment (e.g., a cloud-based computing platform) by improving processing performance of the cloud computing environment and/or improving processing efficiency of the cloud computing environment. In one example, the system 100 can be associated with an orchestration engine process.

In the embodiment shown in FIG. 1, the system 100 can include a cloud resource digital ledger component 102. As shown in FIG. 1, the cloud resource digital ledger component 102 can include an orchestration engine component 104 and a blockchain component 106. Aspects of the cloud resource digital ledger component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the cloud resource digital ledger component 102 can also include memory 108 that stores computer executable components and instructions. Furthermore, the cloud resource digital ledger component 102 can include a processor 110 to facilitate execution of the instructions (e.g., computer executable components and corresponding instructions) by the cloud resource digital ledger component 102. As shown, the orchestration engine component 104, the blockchain component 106, the memory 108 and/or the processor 110 can be electrically and/or communicatively coupled to one another in one or more embodiments. In certain embodiments, the cloud resource digital ledger component 102 can be in communication with a cloud-based computing platform 112. The cloud-based computing platform 112 can be a cloud computing environment. In one example, the cloud-based computing platform 112 can be a hybrid cloud-based computing platform. In another example, the cloud-based computing platform 112 can be a public cloud-based computing platform. In yet another example, the cloud-based computing platform 112 can be a private cloud-based computing platform.

The orchestration engine component 104 can manage one or more computing resources for the cloud-based computing platform 112. In an embodiment, the orchestration engine component 104 can determine one or more computing resources for the cloud-based computing platform 112. The one or more computing resources for the cloud-based computing platform 112 can include one or more computing resources for hardware associated with the cloud-based computing platform 112 and/or one or more computing resources for software associated with the cloud-based computing platform 112. In a non-limiting example, the one or more computing resources can include one or more computing resources for a processor associated with the cloud-based computing platform 112, one or more computing resources for a virtual machine associated with the cloud-based computing platform 112, one or more computing resources for storage associated with the cloud-based computing platform 112, one or more computing resources for middleware associated with the cloud-based computing platform 112, and/or one or more other computing resources associated with the cloud-based computing platform 112. In an embodiment, the orchestration engine component 104 can manage one or more computing resources for a cloud provider device associated with the cloud-based computing platform 112, for a service provider device associated with the cloud-based computing platform 112, for an application provider device associated with the cloud-based computing platform 112, for a support provider device associated with the cloud-based computing platform 112, for a customer device associated with the cloud-based computing platform 112 and/or for an orchestration engine associated with the cloud-based computing platform 112. In another embodiment, the orchestration engine component 104 can generate multiple time periods and/or layers over which computing resource consumption of the cloud-based computing platform 112 can be tracked. For instance, the orchestration engine component 104 can track processor usage associated with the cloud-based computing platform 112 over a defined interval of time (e.g., blocks of three hours or other intervals), while also tracking another computing resource over another defined interval of time (e.g., 24 hour intervals).

In certain embodiments, the orchestration engine component 104 can receive a blueprint associated with the cloud-based computing platform 112. The blueprint associated with the cloud-based computing platform 112 can be, for example, a template or a pattern that declares one or more computing resources for the cloud-based computing platform 112. The blueprint associated with the cloud-based computing platform 112 can also describe a type of computing resource and/or properties for a computing resource that is created for the cloud-based computing platform 112. In an aspect, the blueprint can be exported from the cloud-based computing platform 112 as a readable text file. The readable text file associated with the blueprint can be formatted in a machine-readable format and a human-readable format. For example, the blueprint can be a machine-readable representation and a human-readable representation of the one or more computing resources. In one example, the readable text file associated with the blueprint can be formatted in a machine-readable format and a human-readable format associated with a data serialization language. In another example, the readable text file associated with the blueprint can be formatted in a machine-readable format and a human-readable format associated with a declarative language. In yet another example, the readable text file associated with the blueprint can be formatted in a machine-readable format and a human-readable format associated with automated documentation. As such, the blueprint associated with the cloud-based computing platform 112 can be a declarative representation of one or more computing resources for the cloud-based computing platform 112 that is formatted in a machine-readable format and a human-readable format. In an aspect, the orchestration engine component 104 can interpret content of the blueprint to determine the one or more computing resources for the cloud-based computing platform 112. For example, the orchestration engine component 104 can interpret machine-readable content and/or human-readable content to determine the one or more computing resources for the cloud-based computing platform 112. In an embodiment, the orchestration engine component 104 can determine one or more dependencies between the one or more computing resources for the cloud-based computing platform 112 based on the content of the blueprint. In another embodiment, the orchestration engine component 104 can modify the one or more computing resources determined for the cloud-based computing platform 112. For example, the orchestration engine component 104 can generate one or more modified computing resources for the cloud-based computing platform 112 by modifying the one or more computing resources determined from the blueprint associated with the cloud-based computing platform 112. In one example, the orchestration engine component 104 can modify a previous version of the one or more computing resources to generate the one or more computing resources for the cloud-based computing platform 112.

The blockchain component 106 can add event data into a blockchain dataset for the cloud-based computing platform 112. For instance, the blockchain component 106 can add event data indicative of an event associated with a contract transaction (e.g., a smart contract transaction) between the one or more computing resources into a blockchain dataset for the cloud-based computing platform 112. The event data can be indicative of one or more events associated with the one or more computing resources for the cloud-based computing platform 112. For instance, an event can include adding a service to computing resource (e.g., a virtual machine) associated with the cloud-based computing platform 112, monitoring a computing resource associated with the cloud-based computing platform 112, backing up a computing resource associated with the cloud-based computing platform 112, adding a patch to the cloud-based computing platform 112, performing a security process associated with the cloud-based computing platform 112, deleting a computing resource associated with the cloud-based computing platform 112, updating a computing resource associated with the cloud-based computing platform 112, invoking an application programming interface associated with the cloud-based computing platform 112, etc. The blockchain dataset can be a sequence of data blocks that corresponds to a sequence of events for the cloud-based computing platform 112. In one example, a first block of the blockchain dataset can be associated with a provisioning event of a particular computing resource associated with the cloud-based computing platform 112. In another example, a first block of the blockchain dataset can be a particular workload associated with the cloud-based computing platform 112. In yet another example, a first block of the blockchain dataset can be a grouping of computing resources associated with the cloud-based computing platform 112. In yet another example, a first block of the blockchain dataset can be a particular customer identity associated with the cloud-based computing platform 112. However, it is to be appreciated that a first block of the blockchain dataset include other information associated with the cloud-based computing platform 112.

In an embodiment, the blockchain component 106 can add the event data into the blockchain dataset in response to a determination that the event data satisfies a defined criterion associated with a risk level. For instance, one or more events selected by the blockchain component 106 to be added into the blockchain dataset can be varied according to risk level data indicative of a risk level (e.g., an estimated risk level) associated with the cloud-based computing platform 112 during a defined period of time. In another embodiment, the blockchain component 106 can vary a rate for adding the event data into the blockchain dataset based on risk level data indicative of a risk level associated with the cloud-based computing platform 112 during a defined period of time. For example, content stored in the blockchain dataset and/or a rate of addition to the blockchain dataset can be controlled by the blockchain component 106. Furthermore, a rate of addition of one or more events into the blockchain dataset may vary according to risk level data indicative of a risk level associated with the cloud-based computing platform 112 during a defined period of time. In a non-limiting example, a first risk level can be associated with a transaction that is performed infrequently by a virtual machine of the cloud-based computing platform 112 during normal usage (e.g., a transaction is performed every minute that includes information regarding a running state of a central processing unit and/or memory). Furthermore, a second risk level can be associated with multiple transactions that are performed by a virtual machine of the cloud-based computing platform 112 during high volume of usage (e.g., a transaction is performed every second when a central processing unit and/or memory usage satisfies a defined threshold). A risk level can be associated with risk of computer intrusion, risk of security breaches, risk of disaster, risk of power outages, high resource utilization, patching risk, compliance checks, inspections, and/or another type of risk. In certain embodiments, the blockchain component 106 can employ a service level indicator and/or classes to determine the nature of content and/or a rate of addition to the blockchain dataset. In another embodiment, the blockchain component 106 can employ resource tracking to compare an actual amount of data to an amount specified in an agreement. Furthermore, the blockchain component 106 can adjust the one or more computing resources of the cloud-based computing platform 112 accordingly while also changing a rate of addition of information to the blockchain dataset and/or changing nature of content added to the blockchain dataset. In certain embodiments, the blockchain component 106 can format the event data as a combination of a plurality of events associated with the one or more computing resources for the cloud-based computing platform 112. In another embodiment, the blockchain component 106 can format the event data as a combination of a plurality of events associated with a contract (e.g., a smart contract) associated with the cloud-based computing platform 112.

In certain embodiments, the orchestration engine component 104 and/or the blockchain component 106 can facilitate display of the one or more computing resources and/or the blockchain dataset. For instance, the orchestration engine component 104 and/or the blockchain component 106 can render the one or more computing resources and/or the blockchain dataset on a display device. The display device can be, for example, a computing device with a display, a computer, a desktop computer, a laptop computer, a monitor device, a smart device, a smart phone, a mobile device, a handheld device, a tablet, a wearable device, a portable computing device or another type of device associated with a display. In an aspect, the orchestration engine component 104 and/or the blockchain component 106 can generate a user interface to display at least a portion of the one or more computing resources and/or the blockchain dataset in a human interpretable format. In certain embodiments, the orchestration engine component 104 and/or the blockchain component 106 can apply the one or more computing resources and/or the blockchain dataset to hardware and/or software associated with the cloud-based computing platform 112.

It is to be appreciated that the cloud resource digital ledger component 102 (e.g., the orchestration engine component 104 and/or the blockchain component 106) performs an orchestration engine process and/or a data management process associated with a blockchain dataset that cannot be performed by a human (e.g., is greater than the capability of a single human mind). For example, an amount of data processed, a speed of processing of data (e.g., a speed of processing data associated with multiple parties) and/or data types processed by the cloud resource digital ledger component 102 (e.g., the orchestration engine component 104 and/or the blockchain component 106) over a certain period of time can be greater, faster and different than an amount, speed and data type that can be processed by a single human mind over the same period of time. The cloud resource digital ledger component 102 (e.g., the orchestration engine component 104 and/or the blockchain component 106) can also be fully operational towards performing one or more other functions (e.g., fully powered on, fully executed, etc.) while also performing the above-referenced orchestration engine process and/or data management process associated with a blockchain dataset. Moreover, the cloud resource digital ledger component 102 (e.g., the orchestration engine component 104 and/or the blockchain component 106) can include information that is impossible to obtain manually by a user. For example, a type of information included in the blockchain dataset, an amount of information included in the blockchain dataset and/or a variety of information included in the blockchain dataset can be more complex than information obtained manually by a user.

Additionally, it is to be appreciated that the system 100 can provide various advantages as compared to conventional orchestration engines. For instance, exchange of event information for the cloud-based computing platform 112 can be improved by employing the system 100, control of information and/or transaction associated with the cloud-based computing platform 112 can be improved by employing the system 100, quality of data obtained from the cloud-based environment can be improved by employing the system 100, durability and reliability of data obtained from the cloud-based computing platform 112 can be improved by employing the system 100, transaction integrity associated with the cloud-based computing platform 112 can be improved by employing the system 100, transparency of changes associated with the cloud-based computing platform 112 can be improved by employing the system 100, simplification of transactions associated with the cloud-based computing platform 112 can be provided by employing the system 100, speed of transactions associated with the cloud-based computing platform 112 can be improved by employing the system 100, and/or a cost of transactions associated with the cloud-based computing platform 112 can be reduced by employing the system 100.

Figure 2:
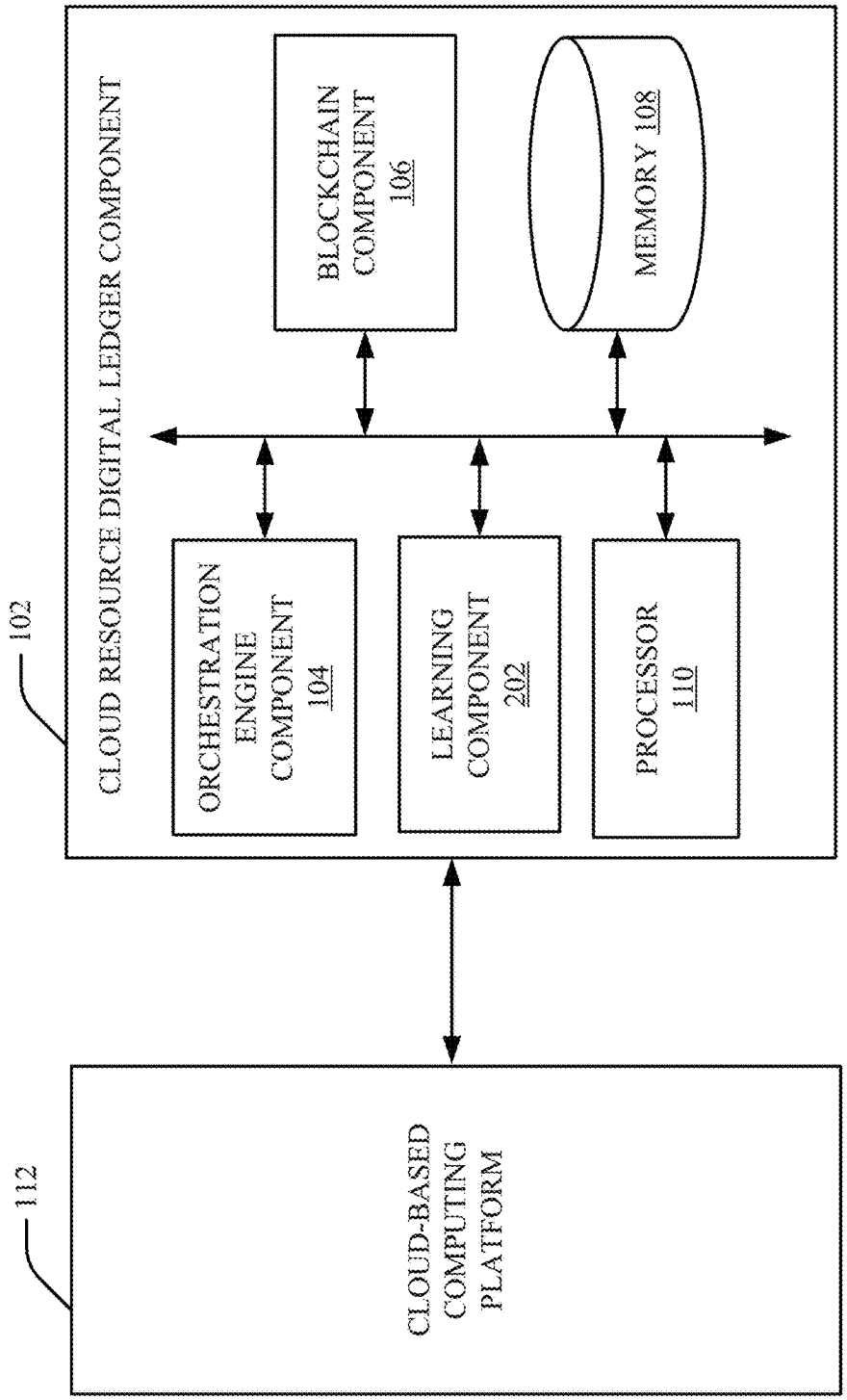
FIG. 2 illustrates a block diagram of another example, non-limiting system that includes a cloud resource digital ledger component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the cloud resource digital ledger component 102. The cloud resource digital ledger component 102 can include the orchestration engine component 104, the blockchain component 106, a learning component 202, the memory 108 and/or the processor 110. The learning component 202 can monitor the cloud-based computing platform 112 to facilitate learning of one or more features and/or information related to one or more resources associated with the cloud-based computing platform 112. For example, the learning component 202 can monitor the cloud-based computing platform 112 to learn one or more features and/or information related to one or more computing resources associated with the cloud-based computing platform 112. In an embodiment, the learning component 202 can employ machine learning and/or principles of artificial intelligence (e.g., a machine learning process) to learn one or more features and/or information related to one or more computing resources associated with the cloud-based computing platform 112. The learning component 202 can perform learning with respect to learning one or more features and/or information related to one or more computing resources associated with the cloud-based computing platform 112 explicitly or implicitly. In an aspect, the learning component 202 can learn one or more features and/or information related to one or more computing resources associated with the cloud-based computing platform 112 based on classifications, correlations, inferences and/or expressions associated with principles of artificial intelligence. For instance, the learning component 202 can employ an automatic classification system and/or an automatic classification process to learn one or more features and/or information related to one or more computing resources associated with the cloud-based computing platform 112. In one example, the learning component 202 can employ a probabilistic and/or statistical-based analysis (e.g., factoring into the analysis utilities and costs) to learn and/or generate inferences with respect to the cloud-based computing platform 112. In an aspect, the learning component 202 can include an inference component (not shown) that can further enhance automated aspects of the learning component 202 utilizing in part inference based schemes to learn one or more features and/or information related to one or more computing resources associated with the cloud-based computing platform 112.

The learning component 202 can employ any suitable machine-learning based techniques, statistical-based techniques and/or probabilistic-based techniques. For example, the learning component 202 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the learning component 202 can perform a set of machine learning computations associated with learning one or more features and/or information related to one or more computing resources associated with the cloud-based computing platform 112. For example, the learning component 202 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more features and/or information related to one or more computing resources associated with the cloud-based computing platform 112.

Additionally, it is to be appreciated that the system 200 can provide various advantages as compared to conventional orchestration engines. For instance, exchange of event information for the cloud-based computing platform 112 can be improved by employing the system 200, control of information and/or transaction associated with the cloud-based computing platform 112 can be improved by employing the system 200, quality of data obtained from the cloud-based environment can be improved by employing the system 200, durability and reliability of data obtained from the cloud-based computing platform 112 can be improved by employing the system 200, transaction integrity associated with the cloud-based computing platform 112 can be improved by employing the system 200, transparency of changes associated with the cloud-based computing platform 112 can be improved by employing the system 200, simplification of transactions associated with the cloud-based computing platform 112 can be provided by employing the system 200, speed of transactions associated with the cloud-based computing platform 112 can be improved by employing the system 200, and/or a cost of transactions associated with the cloud-based computing platform 112 can be reduced by employing the system 200.

Figure 3:
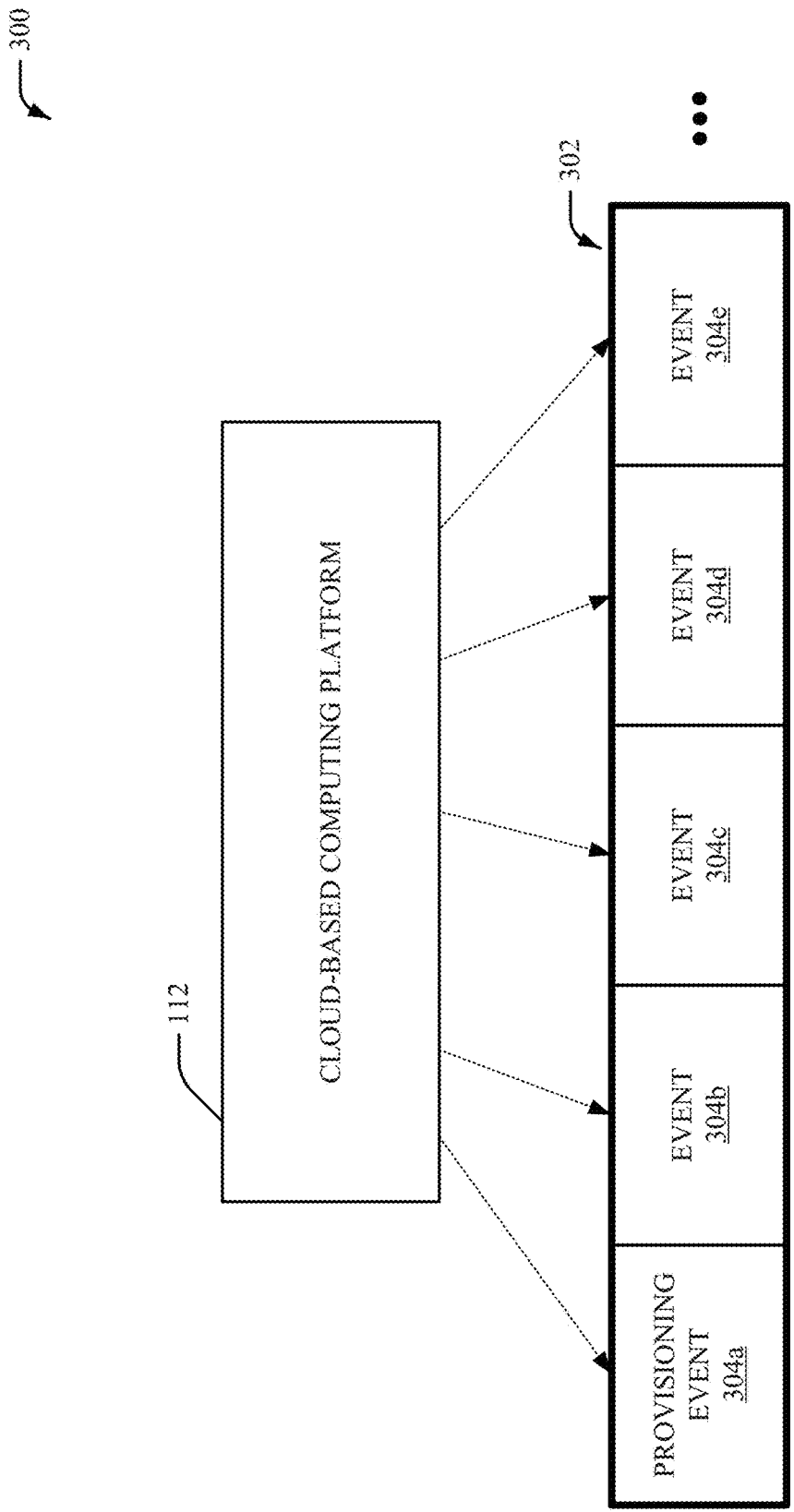
FIG. 3 illustrates an example, non-limiting system that includes a cloud-based computing platform and a blockchain dataset in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the cloud-based computing platform 112 and a blockchain dataset 302. In an embodiment, the cloud resource digital ledger component 102 can generate the blockchain dataset 302 based on event data indicative of one or more events associated with one or more computing resources for the cloud-based computing platform 112. For example, the blockchain dataset 302 can include event data such as provisioning data 304a, event A 304b, event B 304c, event C 304d, event d 304e, etc. The provisioning data 304a can be a start block (e.g., an anchor block) for the blockchain dataset 302. Furthermore, the provisioning data 304a can be a creation (e.g., a provisioning) of a particular computing resource, a particular workload, a grouping of computing resources, or a particular customer identity associated with the cloud-based computing platform 112. The event 304b, the event 304c, the event 304d, and the event 304e can be, for example, a sequence of data blocks that corresponds to a sequence of events for the cloud-based computing platform 112. For example, the event 304b can correspond to data for one or more first events associated with the cloud-based computing platform 112, the event 304c can correspond to data for one or more second events associated with the cloud-based computing platform 112, the event 304d can correspond to data for one or more third events associated with the cloud-based computing platform 112, and the event 304e can correspond to data for one or more fourth events associated with the cloud-based computing platform 112. In an aspect, the event 304b, the event 304c, the event 304d, and the event 304e can correspond to different events. Additionally or alternatively, the event 304b, the event 304c, the event 304d, and the event 304e can correspond to different computing resources associated with the cloud-based computing platform 112 and/or different features associated with the cloud-based computing platform 112. In an embodiment, a set of events can be condensed or amalgamated for a single entry (e.g., the event 304b, the event 304c, the event 304d, and the event 304e) into the blockchain dataset 302. For example, related events can be grouped together into a single larger encompassing event. Therefore, in certain embodiments, related events can be grouped as a single transaction rather than multiple transactions. In one example, a patching event can include updates to many packages associated with the cloud-based computing platform 112. Therefore, instead of generating a transaction per package update, the cloud-based computing platform 112 (e.g., the blockchain component 106) can generate a single patching event as a transaction to the blockchain dataset 302. In certain embodiments, the blockchain dataset 302 (e.g., the event 304b, the event 304c, the event 304d, and the event 304e) can record, at a defined level of granularity, consumption of processor resources, software resources, and/or other computing resources associated with the cloud-based computing platform 112.

Figure 4:
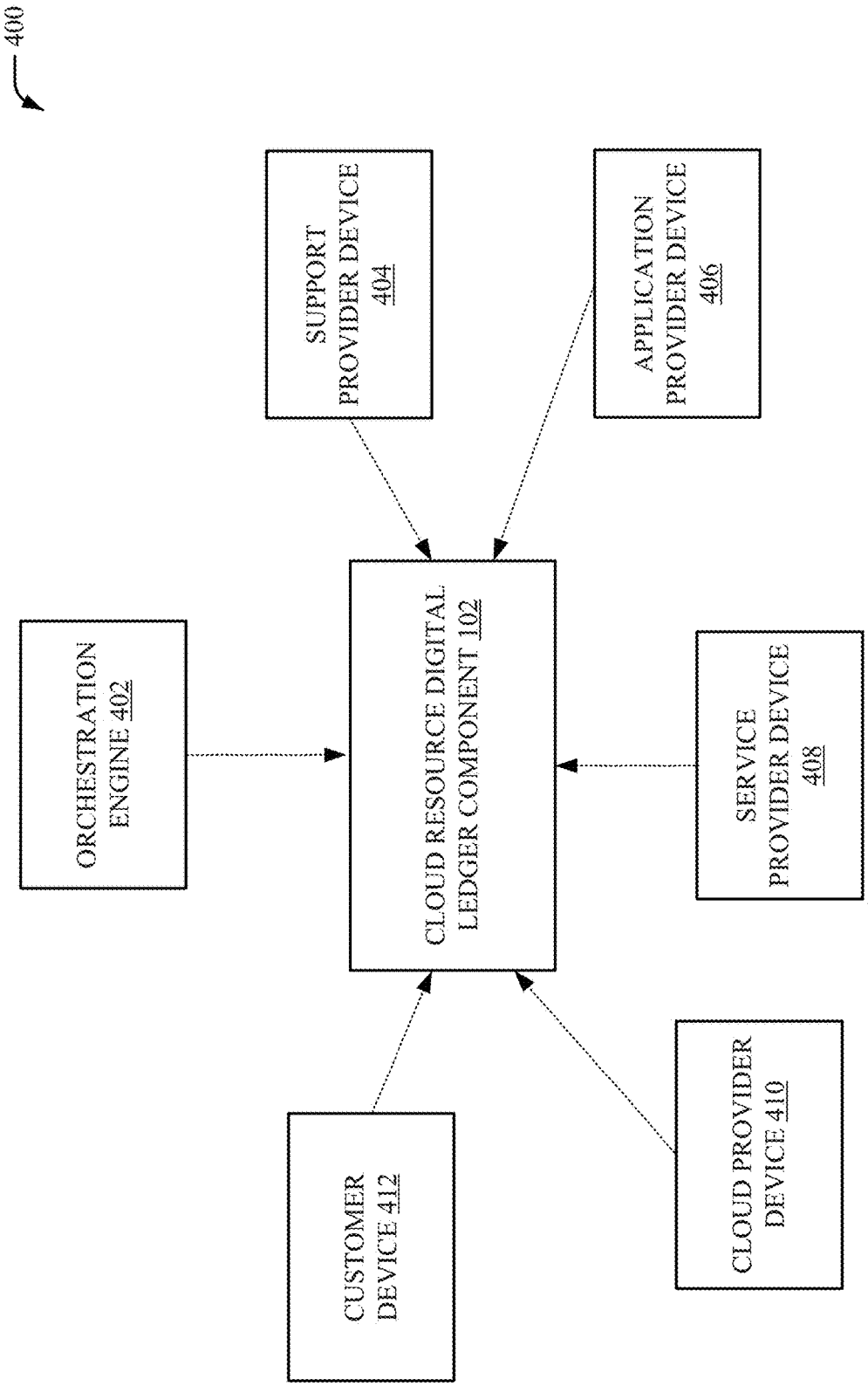
FIG. 4 illustrates an example, non-limiting system that facilitates a blockchain for a cloud resource digital ledger in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes the cloud resource digital ledger component 102. The system 400 also includes an orchestration engine 402, a support provider device 404, an application provider device 406, a service provider device 408, a cloud provider device 410 and/or a customer device 412. In an embodiment, the orchestration engine 402, the support provider device 404, the application provider device 406, the service provider device 408, the cloud provider device 410 and/or the customer device 412 can correspond to different devices associated with the cloud-based computing platform 112. In another embodiment, the orchestration engine 402, the support provider device 404, the application provider device 406, the service provider device 408, the cloud provider device 410 and/or the customer device 412 can be associated with an instance data ledger (e.g., a global database) that stores a blockchain dataset. For example, the cloud resource digital ledger component 102 can store a global state and/or one or more event transactions for one or more cloud resources (e.g., one or more cloud resources associated with the orchestration engine 402, the support provider device 404, the application provider device 406, the service provider device 408, the cloud provider device 410 and/or the customer device 412) in a blockchain dataset. Individual data blocks of the blockchain data set can correspond to individual events (e.g., individual transactions). An event can include, for example, a start to a process, a shutdown of a process, an update and/or a change associated with the orchestration engine 402, the support provider device 404, the application provider device 406, the service provider device 408, the cloud provider device 410 and/or the customer device 412. In an aspect, a global state of one or more resources associated with the orchestration engine 402, the support provider device 404, the application provider device 406, the service provider device 408, the cloud provider device 410 and/or the customer device 412 can be stored in a ledger associated with the cloud resource digital ledger component 102. In a non-limiting example, the orchestration engine 402 can provision a workload. Furthermore, the support provider device 404 can restart a virtual machine associated with the cloud-based computing platform 112. The application provider device 406 can install middleware and/or an application on the cloud-based computing platform 112. The service provider device 408 can perform a software patch associated with the cloud-based computing platform 112. Additionally, the cloud provider device 410 can increase memory of the cloud-based computing platform 112. The customer device 412 can, for example, change a password associated with the cloud-based computing platform 112.

In an embodiment, a customer associated with the customer device 412 can request a cloud-computing environment associated with the cloud-computing platform 112. An infrastructure deployer associated with the support provider device 404 can deploy one or more virtual machines and/or baremetal machines associated with the cloud-computing platform 112. Additionally, the infrastructure deployer associated with the support provider device 404 can provide a middleware installation to a next party. A middleware deployer associated with the application provider device 406 can deploy the middleware using a blueprint. Furthermore, after the middleware is installed, an application deployer associated with the application provider device 406 can provide the middleware to a next party for application installation. An operational manager associated with the service provider device 408 can perform one or more operational activities (e.g., one or more daily operational activities) associated with the cloud-computing platform 112, one or more patching updates associated with the cloud-computing platform 112, and/or one or more security updates associated with the cloud-computing platform 112.

In an aspect, a handover of an environment from one party to another party may be simultaneously involved. Alternatively, a handover from one party to multiple parties may be simultaneously involved. Furthermore, one or more auto-scaling requests and/or one or more requests for a change in hardware associated with the cloud-computing platform 112 and/or a configuration associated with the cloud-computing platform 112 can occur that can be based on information gathered from one or more virtual machines and/or middleware that employ re-involvement of previous parties. In certain embodiments, an external scaling decision process can trigger adding new one or more virtual machines associated with the cloud-computing platform 112, installing middleware associated with the cloud-computing platform 112, and/or installing one or more applications associated with the cloud-computing platform 112. With the cloud resource digital ledger component 102, even if this orchestration is automated, parties involved can obtain a corresponding view of the cloud-based computing platform 112 such as, for example, when an event associated with the cloud-based computing platform 112 has occurred, what event (e.g., auto-scaling) associated with the cloud-based computing platform 112 has occurred, etc. In an example, a Software Middleware patch and/or an operating system patch can be installed on the cloud-based computing platform 112. As such, with the cloud resource digital ledger component 102, all parties can be in sync about information associated with the cloud-based computing platform 112 such as, for example, which patches are installed on the cloud-based computing platform 112, if patches need to be removed from the cloud-based computing platform 112 because of one or more problems with the patches, etc. In another example, an operational manager associated with the service provider device 408 can receive one or more messages (e.g., one or more emails) from the cloud resource digital ledger component 102. The one or more messages can include information such as, for example, a time window when one or more virtual machines of the cloud-based computing platform 112 will be taken down or performance will be affected.

In an aspect, the orchestration engine 402, the support provider device 404, the application provider device 406, the service provider device 408, the cloud provider device 410 and/or the customer device 412 can employ a blockchain dataset for reflection of a global state and/or one or more event transactions associated with the cloud-based computing platform 112. As such, an accurate representation of a global resource state can be provided across the orchestration engine 402, the support provider device 404, the application provider device 406, the service provider device 408, the cloud provider device 410 and/or the customer device 412. In certain embodiments, the orchestration engine 402, the support provider device 404, the application provider device 406, the service provider device 408, the cloud provider device 410 and/or the customer device 412 can employ one or more contracts to securely add one or more event transactions to a blockchain data set. For example, the orchestration engine 402, the support provider device 404, the application provider device 406, the service provider device 408, the cloud provider device 410 and/or the customer device 412 can employ a chain code to verify that one or more events (e.g., one or more transactions) are valid. In one example, the cloud resource digital ledger component 102 can reject addition of an event to a blockchain dataset in response to a determination that the event satisfies a defined criterion (e.g., that the event may disrupt one or more services associated with the cloud-based computing platform 112).

Figure 5:
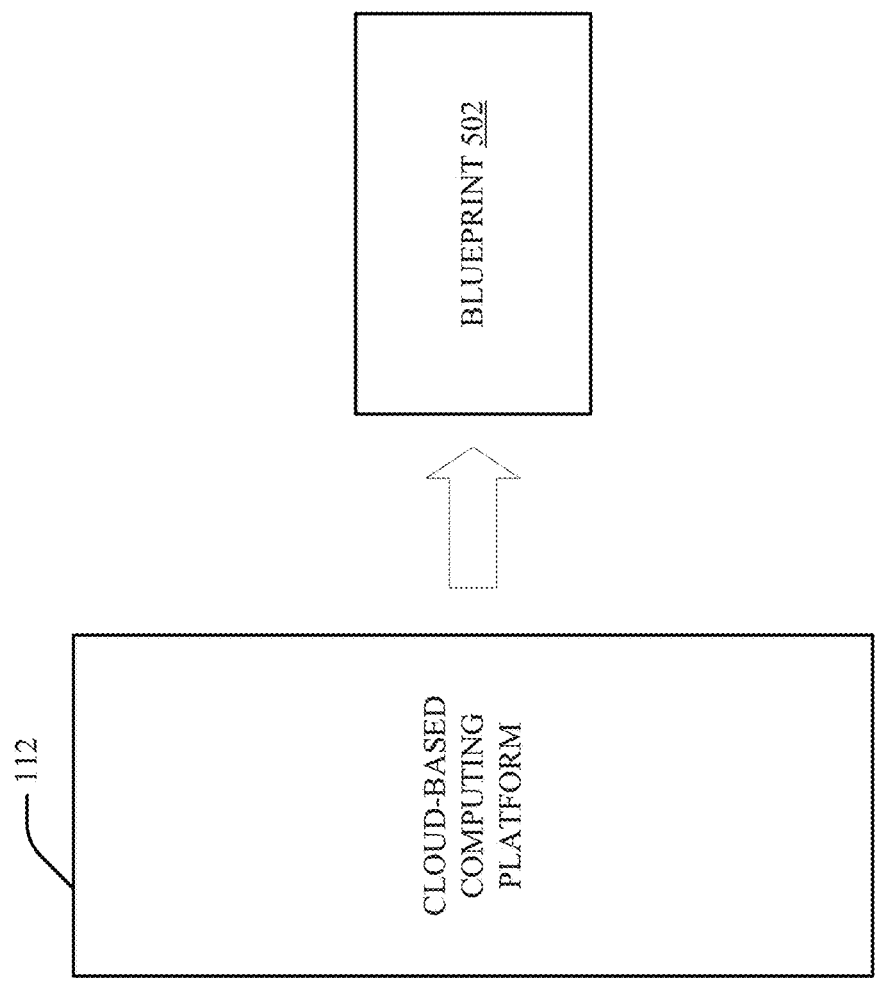
FIG. 5 illustrates an example, non-limiting system that includes a cloud-based computing platform and a blueprint in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes the cloud-based computing platform 112. A blueprint 502 can be generated based on the cloud-based computing platform 112. In an embodiment, the blueprint 502 can be provided by the cloud-based computing platform 112. In another embodiment, the blueprint 502 can be generated by analyzing the cloud-based computing platform 112. The blueprint 502 can be a template or a pattern that declares one or more computing resources for the cloud-based computing platform 112. The blueprint 502 can also describe a type of computing resource and/or properties for a computing resource that is created for the cloud-based computing platform 112. In an aspect, the blueprint 502 can be exported from the cloud-based computing platform 112 as a readable text file. In another aspect, the blueprint 502 can be formatted in a machine-readable format and a human-readable format. For example, the blueprint 502 can be a machine-readable representation and a human-readable representation of the one or more computing resources for the cloud-based computing platform 112. In one example, the blueprint 502 can be formatted in a machine-readable format and a human-readable format associated with a data serialization language. In another example, the blueprint 502 can be formatted in a machine-readable format and a human-readable format associated with a declarative language. In yet another example, the blueprint 502 can be formatted in a machine-readable format and a human-readable format associated with automated documentation. In another aspect, the blueprint 502 can describe one or more attributes of the cloud-based computing platform 112 and/or one or more setting for the cloud-based computing platform 112. Additionally or alternatively, the blueprint 502 can describe a set of inter-related cloud resources of the cloud-based computing platform 112. In certain implementations, one or more resource definitions can be included within the blueprint 502. For example, a description for one or more features and/or one or more qualities associated with one or more resources can be described in the blueprint 502.

Figure 6:
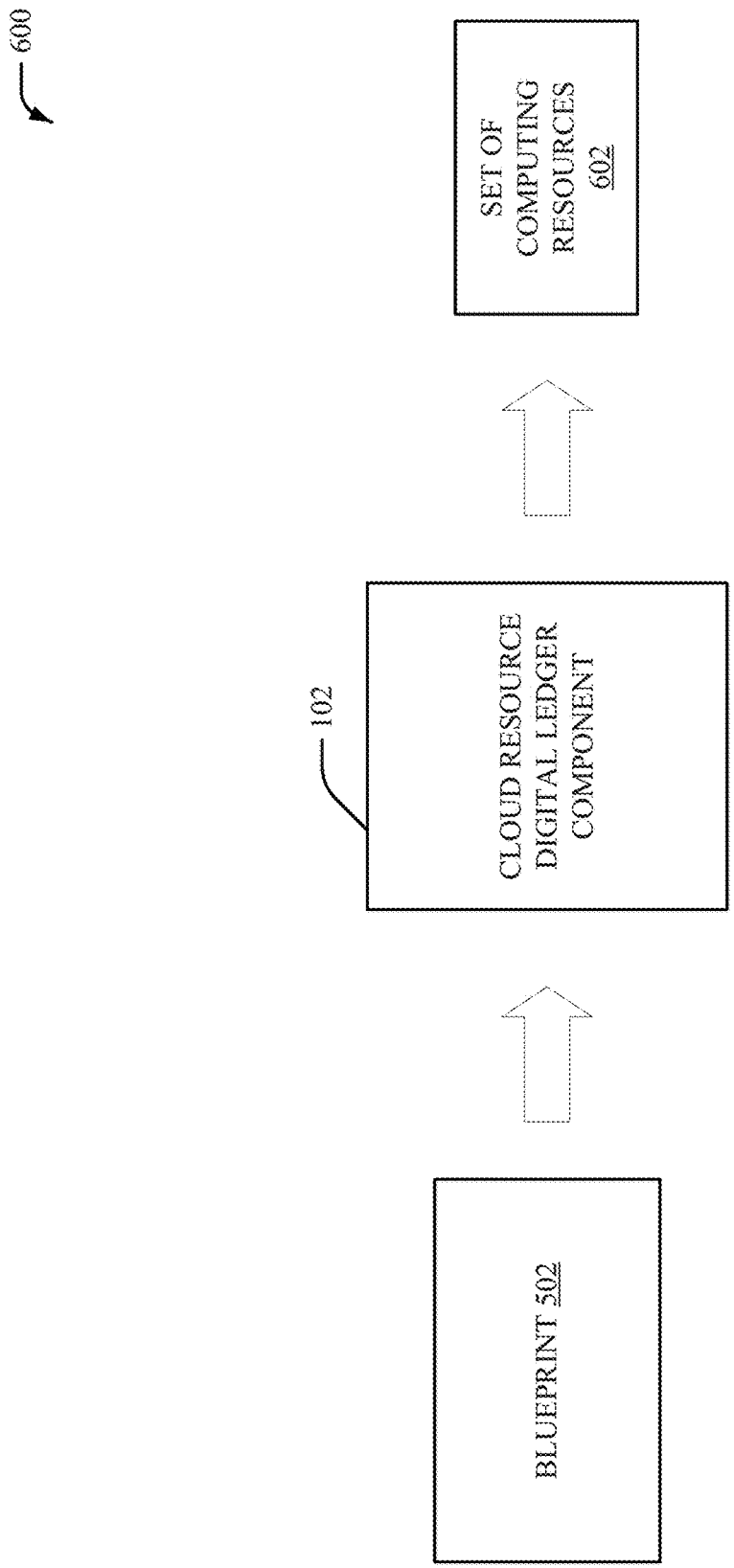
FIG. 6 illustrates an example, non-limiting system that includes a blueprint, a cloud resource digital ledger component, and a set of computing resources in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes the cloud resource digital ledger component 102. The cloud resource digital ledger component 102 can receive the blueprint 502. Based on the blueprint 502, the cloud resource digital ledger component 102 can generate a set of computing resources 602. The set of computing resources 602 can be one or more computing resources associated with the cloud-based computing platform 112. The set of computing resources 602 can include one or more computing resources for hardware associated with the cloud-based computing platform 112 and/or one or more computing resources for software associated with the cloud-based computing platform 112. In a non-limiting example, the set of computing resources 602 can include one or more computing resources for a processor associated with the cloud-based computing platform 112, one or more computing resources for a virtual machine associated with the cloud-based computing platform 112, one or more computing resources for storage associated with the cloud-based computing platform 112, one or more computing resources for middleware associated with the cloud-based computing platform 112, and/or one or more other computing resources associated with the cloud-based computing platform 112. In an aspect example, the cloud resource digital ledger component 102 can extract the set of computing resources 602 from the blueprint 502. Furthermore, the cloud resource digital ledger component 102 can analyze the blueprint 502 to generate the set of computing resources 602.

In certain embodiments, the set of computing resources 602 can include one or more definitions for one or more resources associated with the cloud-based computing platform 112 and/or one or more properties associated with the cloud-based computing platform 112. In an aspect, the set of computing resources 602 can include one or more definitions to facilitate monitoring, auto-scaling, load balancing, event management and/or persistence associated with the cloud-based computing platform 112. In an embodiment, the set of computing resources 602 can include one or more definitions for hardware associated with the cloud-based computing platform 112, one or more definitions for software associated with the cloud-based computing platform 112, one or more definitions for one or more virtual machines associated with the cloud-based computing platform 112, one or more definitions for storage associated with the cloud-based computing platform 112, one or more definitions for middleware associated with the cloud-based computing platform 112, and/or one or more definitions for another resource associated with the cloud-based computing platform 112. In one example, the set of computing resources 602 can include a number of processors and/or a type of processor for the cloud-based computing platform 112. Additionally or alternatively, the set of computing resources 602 can include an amount of memory and/or a type of memory for the cloud-based computing platform 112. Additionally or alternatively, the set of computing resources 602 can include a network speed for the cloud-based computing platform 112. However, it is to be appreciated that the set of computing resources 602 can include other information associated with the cloud-based computing platform 112.

Figure 7:
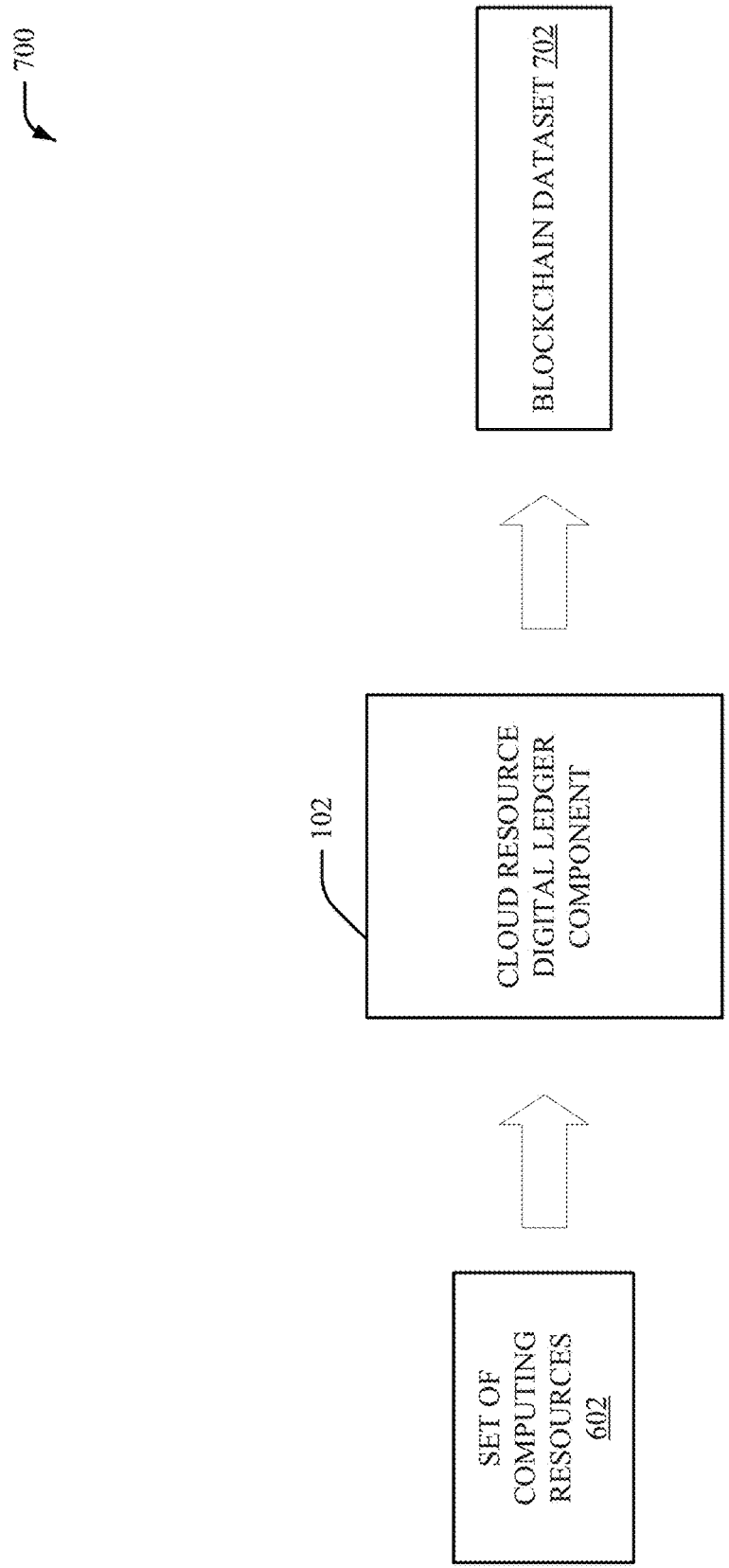
FIG. 7 illustrates an example, non-limiting system that includes a set of computing resources, a cloud resource digital ledger component, and a blockchain dataset in accordance with one or more embodiments described herein.

FIG. 7 illustrates a block diagram of an example, non-limiting system 500 in accordance with one or more embodiments described herein. Repetitive description of like elements employed in other embodiments described herein is omitted for sake of brevity.

The system 700 includes the cloud resource digital ledger component 102. The cloud resource digital ledger component 102 can employ the set of computing resources 602 generated by the cloud resource digital ledger component 102 to generate a blockchain dataset 702. The blockchain dataset 702 can be a sequence of data blocks that corresponds to a sequence of events for the cloud-based computing platform 112. For example, the blockchain dataset 702 can include one or more data blocks that include event data associated with the set of computing resources 602. The event data can be indicative of one or more events associated with the set of computing resources 602. In one example, a first block of the blockchain dataset 702 can be associated with a provisioning event of a particular computing resource from the set of computing resources 602. In another example, a first block of the blockchain dataset 702 can be a particular workload associated with the set of computing resources 602. In yet another example, a first block of the blockchain dataset 702 can be a grouping of computing resources associated with the set of computing resources 602. In yet another example, a first block of the blockchain dataset 702 can be a particular customer identity associated with the set of computing resources 602. However, it is to be appreciated that a first block of the blockchain dataset 702 include other information associated with the set of computing resources 602 and/or the cloud-based computing platform 112.

Figure 8:
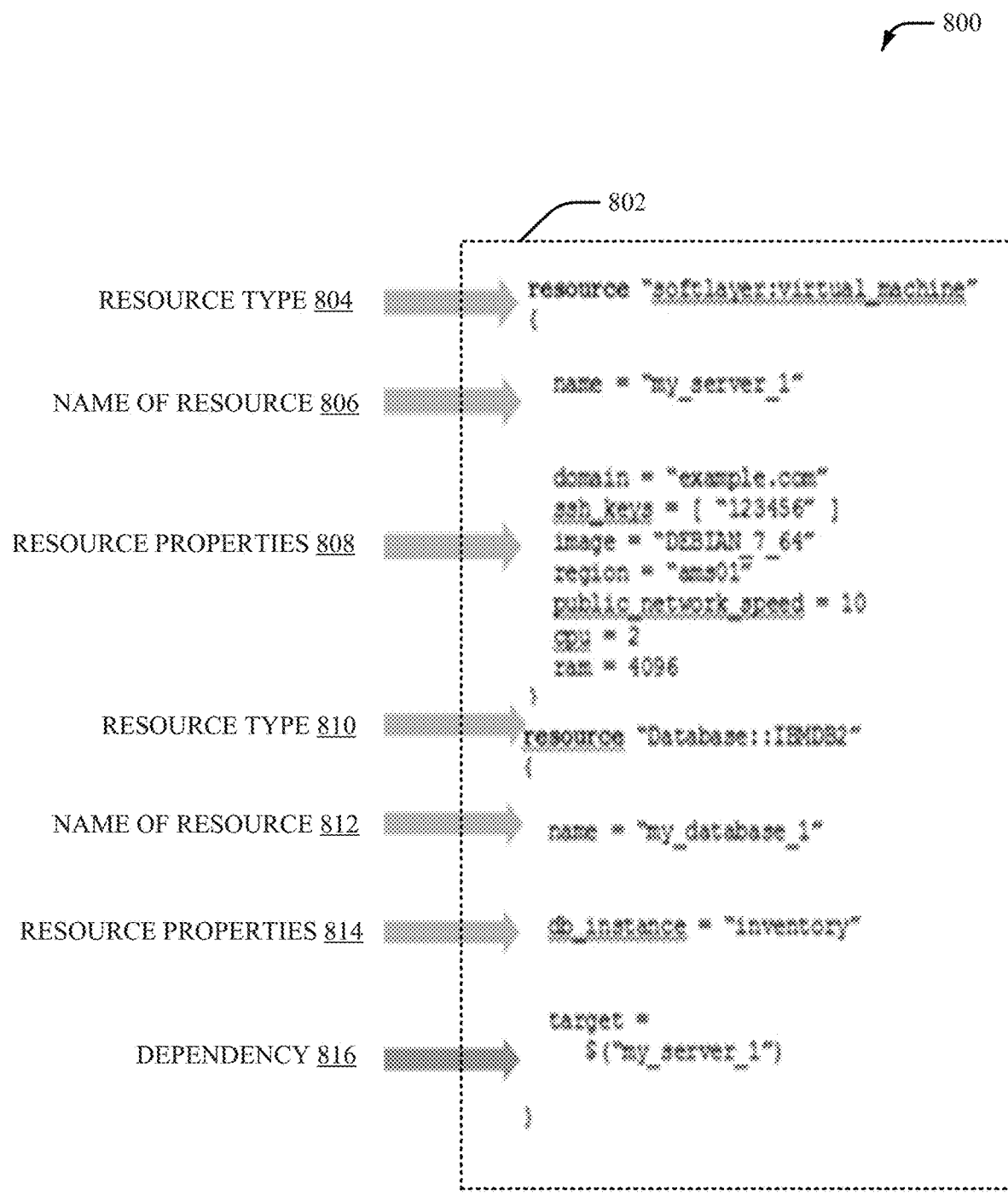
FIG. 8 illustrates an example, non-limiting system that includes a blueprint in accordance with one or more embodiments described herein.

FIG. 8 illustrates a block diagram of an example, non-limiting system 700 in accordance with one or more embodiments described herein. Repetitive description of like elements employed in other embodiments described herein is omitted for sake of brevity.

The system 800 includes a blueprint 802. The blueprint 802 can be a blueprint associated with the cloud-based computing platform 112. Furthermore, the blueprint 802 can be a blueprint employed by the cloud resource digital ledger component 102 to, for example, determine one or more computing resources associated with the cloud-based computing platform 112. In one example, the blueprint 802 can correspond to the blueprint 502. The blueprint 802 can define one or more resources to create for the cloud-based computing platform 112. The blueprint 802 can define relationships and/or dependencies between one or more resources for the cloud-based computing platform 112. For example, storage associated with the cloud-based computing platform 112 can require an association with a virtual machine of the cloud-based computing platform 112, thereby creating a dependency for the storage. Dependencies between resources for the cloud-based computing platform 112 can facilitate creation of one or more resources in a correct order. Furthermore, one or more resources can be uniquely named within the blueprint 802. A resource in the blueprint 802 can include a property value that is explicitly set to a defined value. Additionally or alternatively, a resource in the blueprint 802 can include a property value that is implicitly set via a reference to a property from a different resource in the blueprint 802. Additionally or alternatively, a resource in the blueprint 802 can include a property value that is implicitly set via a reference to an input parameter to the blueprint 802. In an embodiment, the blueprint 802 can be a nested data structure. Furthermore, the blueprint 802 can exchange data with one or more other blueprints for the cloud-based computing platform 112.

In an embodiment, the blueprint 802 can be a template or a pattern that declares one or more computing resources for the cloud-based computing platform 112. The blueprint 802 can also describe a type of computing resource and/or properties for a computing resource that is created for the cloud-based computing platform 112. In an aspect, the blueprint 802 can be exported from the cloud-based computing platform 112 as a readable text file. In another aspect, the blueprint 802 can be formatted in a machine-readable format and a human-readable format. For example, the blueprint 802 can be a machine-readable textual representation and a human-readable textual representation of the one or more computing resources for the cloud-based computing platform 112. In one example, the blueprint 802 can be formatted in a machine-readable format and a human-readable format associated with a data serialization language. In another example, the blueprint 802 can be formatted in a machine-readable format and a human-readable format associated with a declarative language. In yet another example, the blueprint 802 can be formatted in a machine-readable format and a human-readable format associated with automated documentation. The blueprint 802 can be employed, for example, to generate one or more computing resources (e.g., the set of computing resources 602). In a non-limiting example, the blueprint 802 can include a resource type 804, a name of resource 806 for the resource type 804, resource properties 808 for the resource type 804, a resource type 810, a name of resource 812 for the resource type 810, resource properties 814 for the resource type 810, and/or dependency 816.

Figure 9:
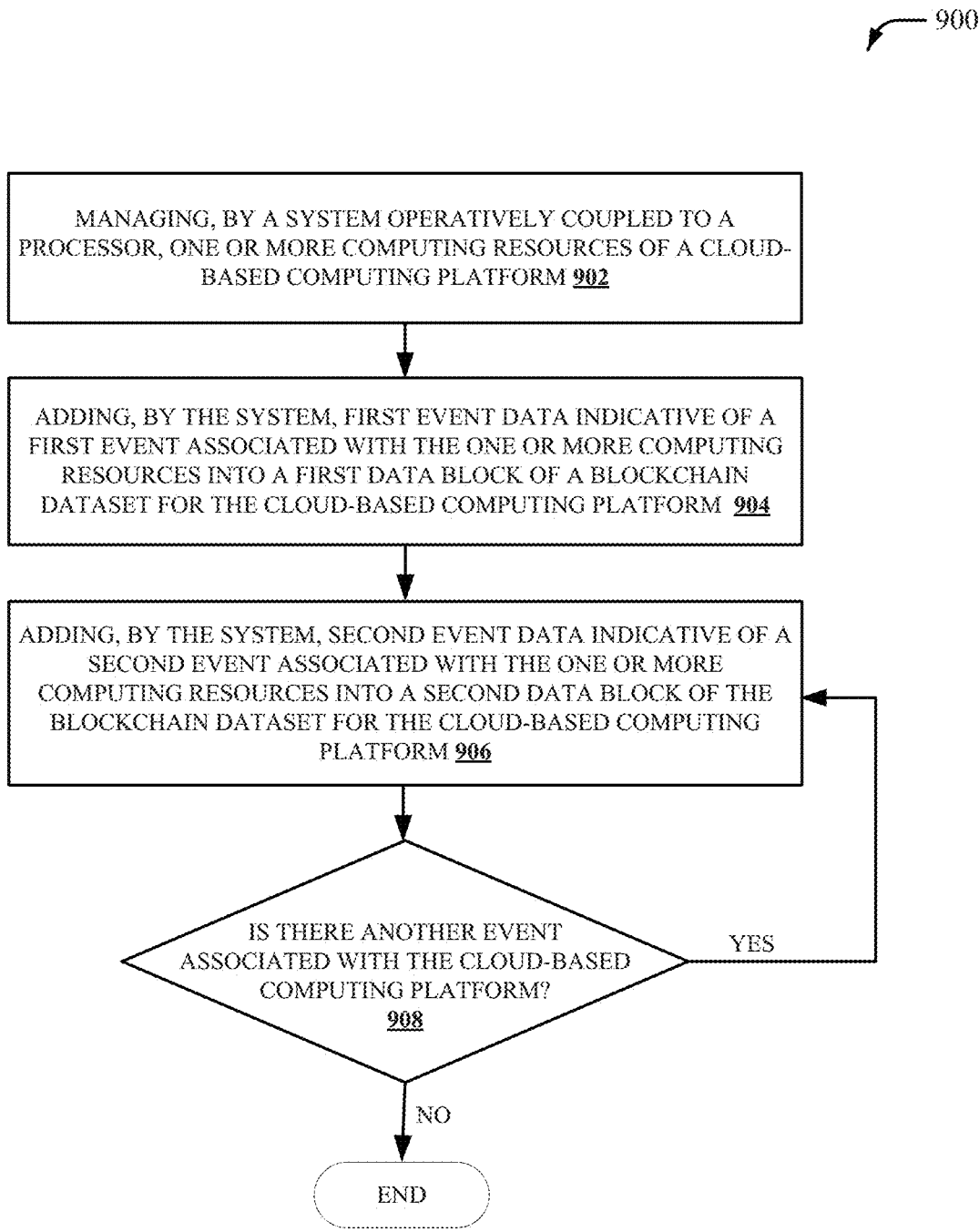
FIG. 9 illustrates a flow diagram of an example, non-limiting computer-implemented method for providing an orchestration engine using a blockchain for a cloud resource digital ledger in accordance with one or more embodiments described herein.

FIG. 9 illustrates a flow diagram of an example, non-limiting computer-implemented method 900 for providing an orchestration engine using a blockchain for a cloud resource digital ledger in accordance with one or more embodiments described herein. At 902, one or more computing resources of a cloud-based computing platform are managed by a system (e.g., by orchestration engine component 104) operatively coupled to a processor. The one or more computing resources can include one or more computing resources for hardware associated with the cloud-based computing platform and/or one or more computing resources for software associated with the cloud-based computing platform. In a non-limiting example, the one or more computing resources can include one or more computing resources for a processor associated with the cloud-based computing platform, one or more computing resources for a virtual machine associated with the cloud-based computing platform, one or more computing resources for storage associated with the cloud-based computing platform, one or more computing resources for middleware associated with the cloud-based computing platform, and/or one or more other computing resources associated with the cloud-based computing platform. In an embodiment, the one or more computing resources can be determined from a blueprint. The blueprint can be, for example, a template or a pattern that declares the one or more computing resources for the cloud-based computing platform. The blueprint can also describe a type of computing resource and/or properties for a computing resource that is created for the cloud-based computing platform. In an aspect, the blueprint can be a machine-readable representation and a human-readable representation of one or more computing resources associated with the cloud-based computing platform. In one example, the blueprint can be formatted in a machine-readable format and a human-readable format associated with a data serialization language. In another example, the blueprint can be formatted in a machine-readable format and a human-readable format associated with a declarative language. In yet another example, the blueprint can be formatted in a machine-readable format and a human-readable format associated with automated documentation.

At 904, first event data indicative of a first event associated with the one or more computing resources is added, by the system (e.g., by blockchain component 106), into a first data block of a blockchain dataset for the cloud-based computing platform. The blockchain dataset can be a sequence of data blocks that corresponds to a sequence of events for the cloud-based computing platform. The first event can be, for example, a start to a process, a shutdown of a process, an update and/or a change associated with the cloud-based computing platform. In an embodiment, the first event data can be added into the first data block of the blockchain dataset in response to a determination that the first event data satisfies a defined criterion associated with a risk level. In another embodiment, the first event data can be added into the first data block of the blockchain dataset based on a risk level associated with the cloud-based computing platform during a defined period of time. In yet another embodiment, the first event data can be formatted as a combination of a plurality of events associated with the one or more computing resources.

At 906, second event data indicative of a second event associated with the one or more computing resources is added, by the system (e.g., by blockchain component 106), into a second data block of the blockchain dataset for the cloud-based computing platform. The second event can be, for example, a start to a process, a shutdown of a process, an update and/or a change associated with the cloud-based computing platform. In an embodiment, the second event data can be added into the second data block of the blockchain dataset in response to a determination that the second event data satisfies a defined criterion associated with a risk level. In another embodiment, the second event data can be added into the second data block of the blockchain dataset based on a risk level associated with the cloud-based computing platform during a defined period of time. In yet another embodiment, the second event data can be formatted as a combination of a plurality of events associated with the one or more computing resources.

At 908, it is determined whether there is another event associated with the cloud-based computing platform. If yes, the computer-implemented method 900 returns to 906 to add other event data (e.g., third event data, etc.) indicative of another event (e.g., a third event, etc.) associated with the one or more computing resources into another data block (e.g., a third data block, etc.) of the blockchain dataset for the cloud-based computing platform. If no, the computer-implemented method 900 can end. In certain embodiments, the computer-implemented method 900 can include managing, by the system, at least one computing resource for a cloud provider device associated with the cloud-based computing platform.

Figure 10:
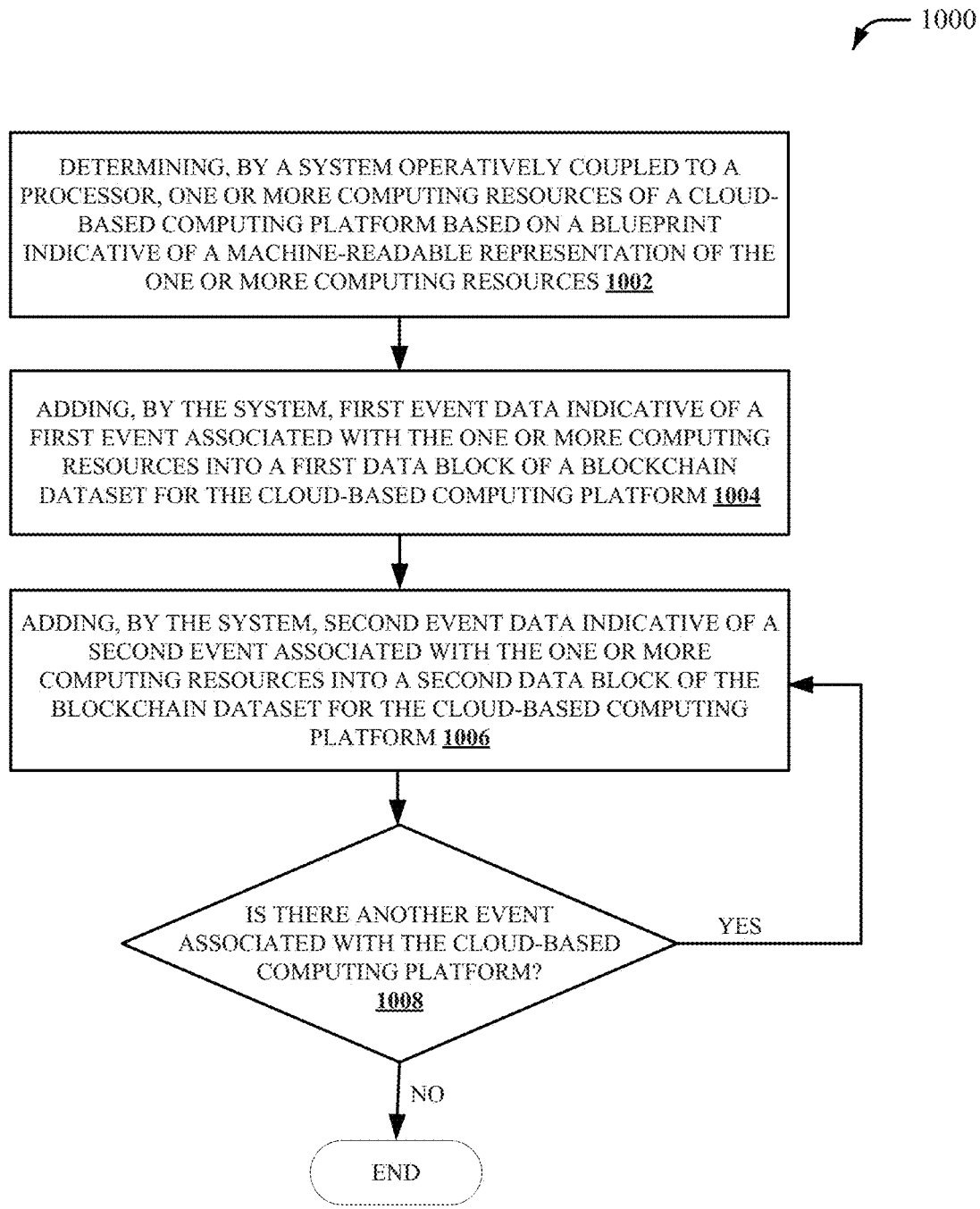
FIG. 10 illustrates a flow diagram of another example, non-limiting computer-implemented method for providing an orchestration engine using a blockchain for a cloud resource digital ledger in accordance with one or more embodiments described herein.

FIG. 10 illustrates a flow diagram of an example, non-limiting computer-implemented method 1000 for providing an orchestration engine using a blockchain for a cloud resource digital ledger in accordance with one or more embodiments described herein. At 1002, one or more computing resources of a cloud-based computing platform are determined, by a system (e.g., by orchestration engine component 104) operatively coupled to a processor, based on a blueprint indicative of a machine-readable representation of the one or more computing resources. The one or more computing resources can include one or more computing resources for hardware associated with the cloud-based computing platform and/or one or more computing resources for software associated with the cloud-based computing platform. In a non-limiting example, the one or more computing resources can include one or more computing resources for a processor associated with the cloud-based computing platform, one or more computing resources for a virtual machine associated with the cloud-based computing platform, one or more computing resources for storage associated with the cloud-based computing platform, one or more computing resources for middleware associated with the cloud-based computing platform, and/or one or more other computing resources associated with the cloud-based computing platform. The blueprint can be, for example, a template or a pattern that declares the one or more computing resources for the cloud-based computing platform. The blueprint can also describe a type of computing resource and/or properties for a computing resource that is created for the cloud-based computing platform. In an aspect, the blueprint can be a machine-readable representation and a human-readable representation of one or more computing resources associated with the cloud-based computing platform. In one example, the blueprint can be formatted in a machine-readable format and a human-readable format associated with a data serialization language. In another example, the blueprint can be formatted in a machine-readable format and a human-readable format associated with a declarative language. In yet another example, the blueprint can be formatted in a machine-readable format and a human-readable format associated with automated documentation.

At 1004, first event data indicative of a first event associated with the one or more computing resources is added, by the system (e.g., by blockchain component 106), into a first data block of a blockchain dataset for the cloud-based computing platform. The blockchain dataset can be a sequence of data blocks that corresponds to a sequence of events for the cloud-based computing platform. The first event can be, for example, a start to a process, a shutdown of a process, an update and/or a change associated with the cloud-based computing platform. In an embodiment, the first event data can be added into the first data block of the blockchain dataset in response to a determination that the first event data satisfies a defined criterion associated with a risk level. In another embodiment, the first event data can be added into the first data block of the blockchain dataset based on a risk level associated with the cloud-based computing platform during a defined period of time. In yet another embodiment, the first event data can be formatted as a combination of a plurality of events associated with the one or more computing resources.

At 1006, second event data indicative of a second event associated with the one or more computing resources is added, by the system (e.g., by blockchain component 106), into a second data block of the blockchain dataset for the cloud-based computing platform. The second event can be, for example, a start to a process, a shutdown of a process, an update and/or a change associated with the cloud-based computing platform. In an embodiment, the second event data can be added into the second data block of the blockchain dataset in response to a determination that the second event data satisfies a defined criterion associated with a risk level. In another embodiment, the second event data can be added into the second data block of the blockchain dataset based on a risk level associated with the cloud-based computing platform during a defined period of time. In yet another embodiment, the second event data can be formatted as a combination of a plurality of events associated with the one or more computing resources.

At 1008, it is determined whether there is another event associated with the cloud-based computing platform. If yes, the computer-implemented method 1000 returns to 1006 to add other event data (e.g., third event data, etc.) indicative of another event (e.g., a third event, etc.) associated with the one or more computing resources into another data block (e.g., a third data block, etc.) of the blockchain dataset for the cloud-based computing platform. If no, the computer-implemented method 1000 can end. In certain embodiments, the computer-implemented method 1000 can include managing, by the system, at least one computing resource for a cloud provider device associated with the cloud-based computing platform.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least determining one or more computing resources and/or generating a blockchain dataset is established from a combination of electrical and mechanical components and circuitry, a human is unable to replicate or perform processing performed by the cloud resource digital ledger component 102 (e.g., the orchestration engine component 104, the blockchain component 106, and/or the learning component 202) disclosed herein. For example, a human is unable to determine one or more computing resources from a cloud-based computing platform, human is unable to add data blocks to a blockchain dataset, etc.

Figure 11:
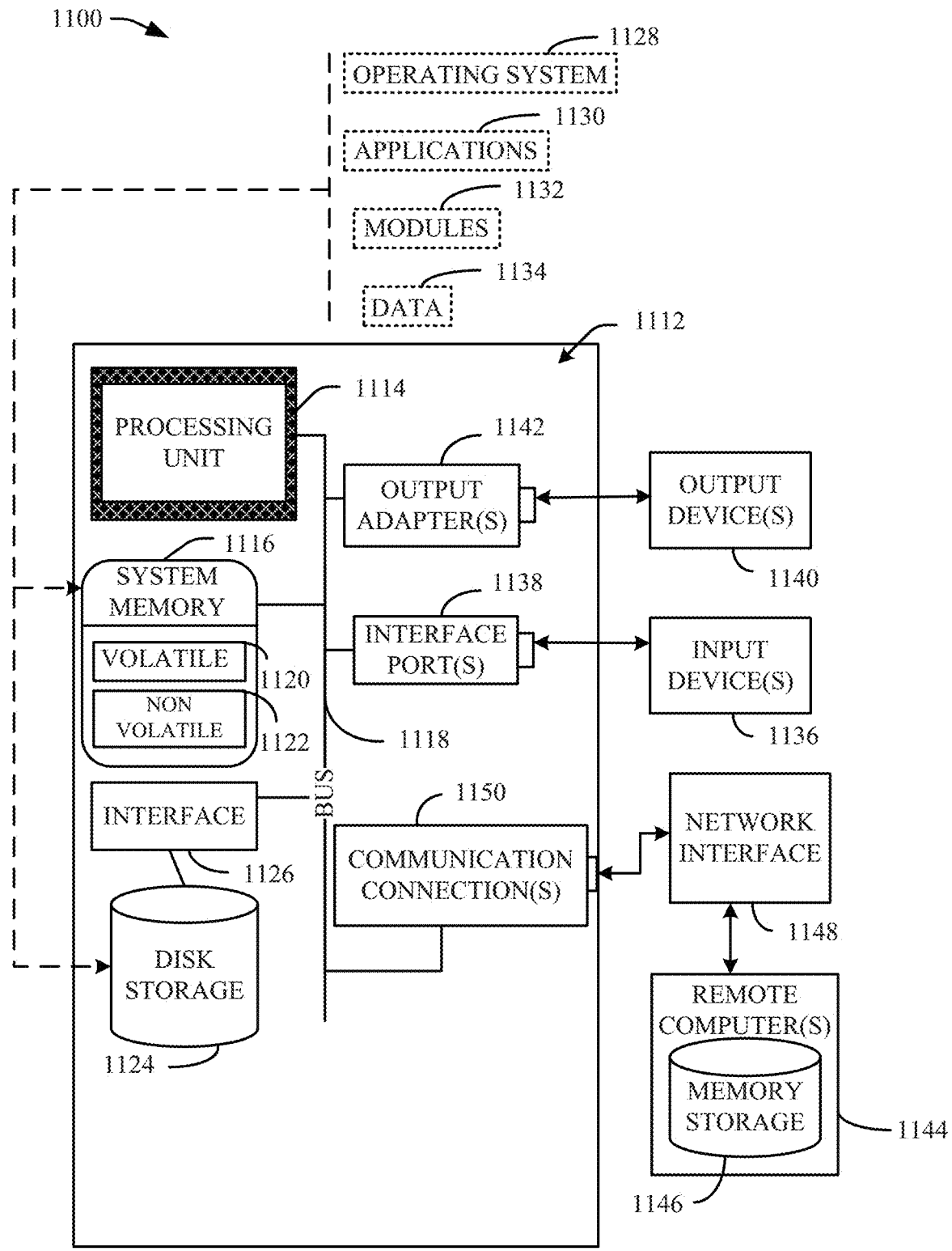
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity.

With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media. To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

Figure 12:
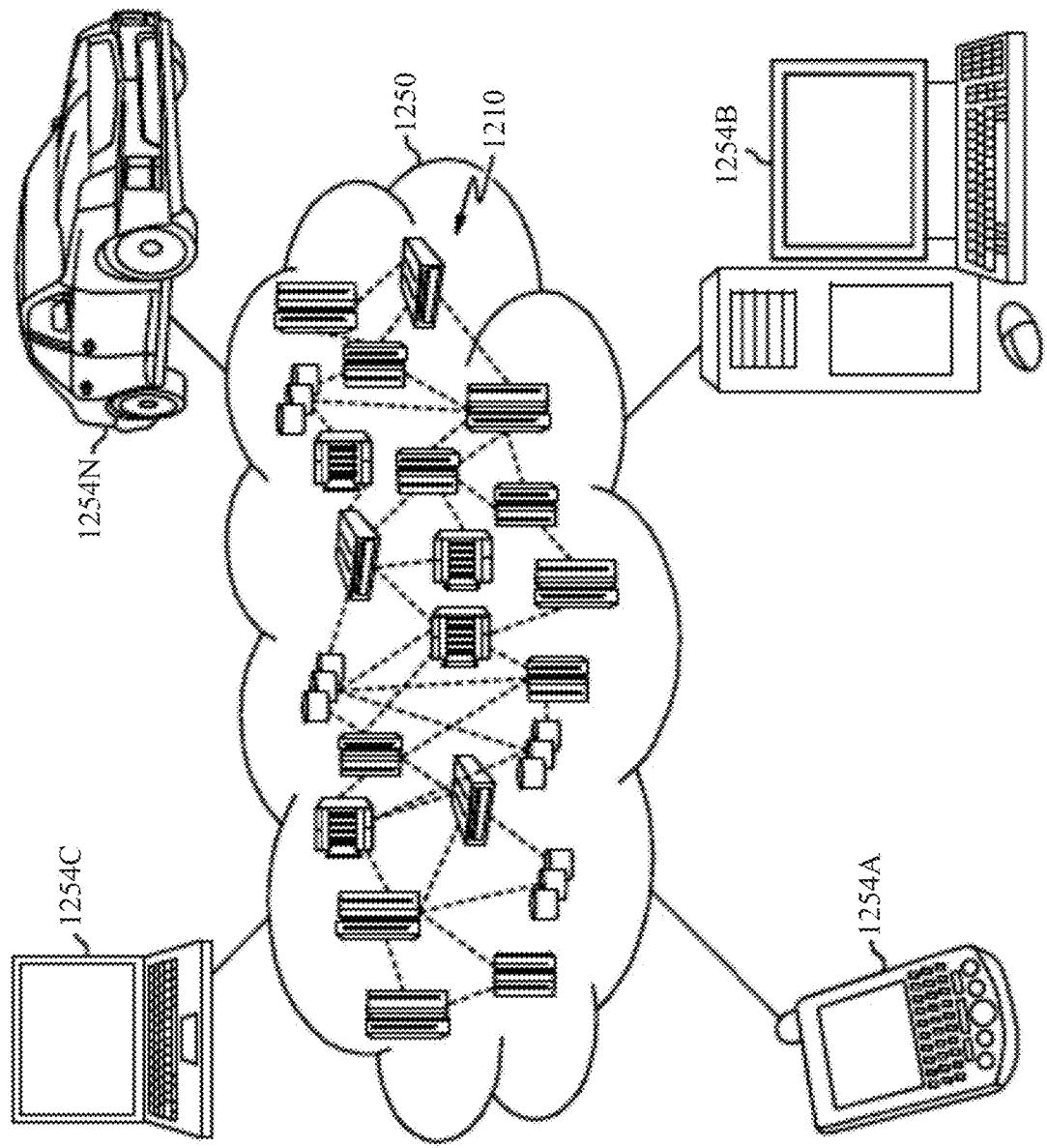
FIG. 12 illustrates a block diagram of an example, non-limiting cloud computing environment in accordance with one or more embodiments of the present invention.

Referring now to FIG. 12, an illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
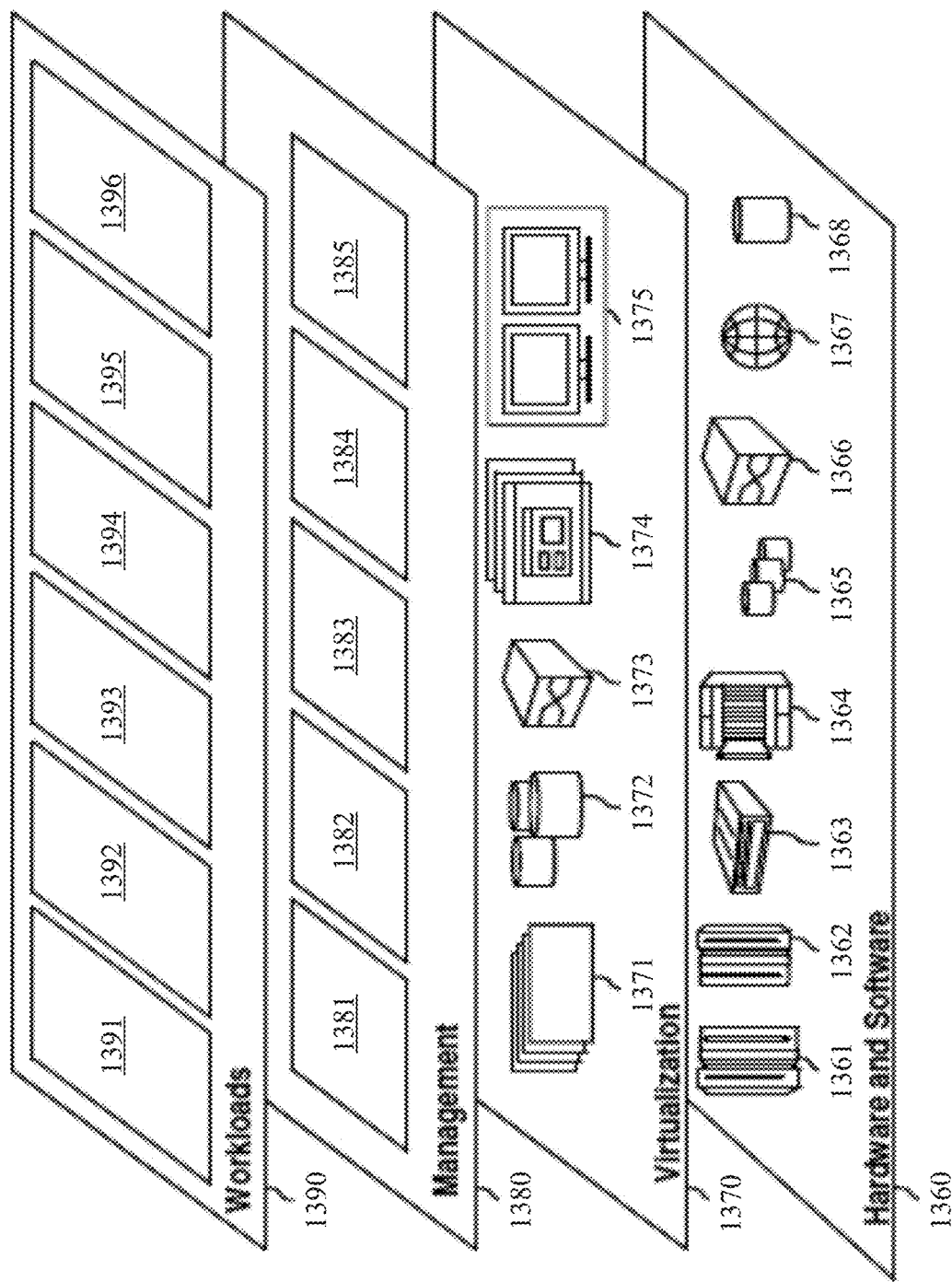
FIG. 13 illustrates a block diagram of example, non-limiting abstraction model layers in accordance with one or more embodiments of the present invention.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372;

virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Non-limiting examples of workloads and functions which may be provided from this layer include: mapping and navigation 1391; software development and lifecycle management 1392; virtual classroom education delivery 1393; data analytics processing 1394; transaction processing 1395; and orchestration engine process software 1396.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components;
    a processor that executes computer executable components stored in the memory, wherein the computer executable components comprise:
        an orchestration engine component that manages one or more computing resources for a cloud-based computing platform; and
        a blockchain component that, in response to a determination that event data indicative of an event associated with the one or more computing resources satisfies a defined criterion associated with a risk level indicative of a risk to the cloud-based computing platform, adds the event data into a blockchain dataset for the cloud-based computing platform, wherein the blockchain dataset comprises a sequence of data blocks that corresponds to a sequence of events for the cloud-based computing platform.

2. The system of claim 1, wherein a first block of the blockchain dataset is associated with a provisioning event of a particular computing resource, a particular workload, a grouping of computing resources, or a particular customer identity associated with the cloud-based computing platform.

3. The system of claim 1, wherein the risk is selected from a group consisting of a risk of computer intrusion, a risk of security breach, a risk of disaster, a risk of power outage, a risk of high resource utilization, a patching risk, and a risk of compliance.

4. The system of claim 1, wherein the blockchain component varies a rate for adding a plurality of event data indicative of events associated with the one or more computing resources into the blockchain dataset based on the risk level.

5. The system of claim 1, wherein the blockchain component formats the event data as a combination of a plurality of events associated with the one or more computing resources.

6. The system of claim 1, wherein the orchestration engine component manages at least one computing resource for a cloud provider device associated with the cloud-based computing platform.

7. The system of claim 1, wherein the cloud-based computing platform is a hybrid cloud-based computing platform, a public cloud-based computing platform, or a private cloud-based computing platform.

8. The system of claim 1, wherein the orchestration engine component determines the one or more computing resources based on a blueprint, and wherein the blueprint is indicative of a machine-readable representation of the one or more computing resources.

9. The system of claim 1, wherein the blockchain component adds the event data into the blockchain dataset to facilitate improved performance for the cloud-based computing platform.

10. A computer-implemented method, comprising:
    managing, by a system operatively coupled to a processor, one or more computing resources of a cloud-based computing platform;
    adding, by the system, first event data indicative of a first event associated with the one or more computing resources into a first data block of a blockchain dataset for the cloud-based computing platform in response to a determination that the first event data satisfies a first defined criterion associated with a first risk level indicative of a first risk to the cloud-based computing platform; and
    adding, by the system, second event data indicative of a second event associated with the one or more computing resources into a second data block of the blockchain dataset for the cloud-based computing platform in response to a determination that the second event data satisfies a second defined criterion associated with a second risk level indicative of a second risk to the cloud-based computing platform.

11. The computer-implemented method of claim 10, wherein the adding the first event data into the first data block of the blockchain dataset comprises adding information associated with a provisioning event of a particular computing resource, a particular workload, a grouping of computing resources, or a particular customer identity into the first data block.

12. The computer-implemented method of claim 10, wherein the first risk is selected from a group consisting of a risk of computer intrusion, a risk of security breach, a risk of disaster, a risk of power outage, a risk of high resource utilization, a patching risk, and a risk of compliance.

13. The computer-implemented method of claim 10, further comprising:

varying, by the system, a rate for adding a plurality of event data indicative of events associated with the one or more computing resources into the blockchain dataset based on the risk level.

14. The computer-implemented method of claim 10, wherein the adding the first event data into the first data block comprises formatting the first event data as a combination of a plurality of events associated with the one or more computing resources.

15. The computer-implemented method of claim 10, further comprising:
managing, by the system, at least one computing resource for a cloud provider device associated with the cloud-based computing platform.

16. The computer-implemented method of claim 10, further comprising:
determining, by the system, the one or more computing resources based on a blueprint that is indicative of a machine-readable representation of the one or more computing resources.

17. The computer-implemented method of claim 10, wherein the adding the first event data into the first data block comprises improving performance of the cloud-based computing platform.

18. A computer program product facilitating an orchestration engine process associated with a blockchain, the computer program product comprising a computer readable storage medium having program instructions embodied therewith, the program instructions executable by a processor to cause the processor to:
monitor, by the processor, one or more computing resources of a cloud-based computing platform;
add, by the processor, first event data indicative of a first event associated with the one or more computing resources into a first data block of a blockchain dataset for the cloud-based computing platform in response to a determination that the first event data satisfies a first defined criterion associated with a first risk level indicative of a first risk to the cloud-based computing platform; and
add, by the processor, second event data indicative of a second event associated with the one or more computing resources into a second data block of the blockchain dataset for the cloud-based computing platform in response to a determination that the second event data satisfies a second defined criterion associated with a second risk level indicative of a second risk to the cloud-based computing platform.

19. The computer program product of claim 18, wherein the first risk is selected from a group consisting of a risk of computer intrusion, a risk of security breach, a risk of disaster, a risk of power outage, a risk of high resource utilization, a patching risk, and a risk of compliance.

20. The computer program product of claim 18, wherein the program instructions are further executable by the processor to cause the processor to:
determine, by the processor, the one or more computing resources based on a blueprint that is indicative of a machine-readable representation of the one or more computing resources.

21. A system, comprising:
a memory that stores computer executable components;
a processor that executes computer executable components stored in the memory, wherein the computer executable components comprise:
a learning component that monitors a cloud-based computing platform to learn one or more features associated with the cloud-based computing platform;
an orchestration engine component that determines one or more computing resources for a cloud-based computing platform based on a blueprint associated with the cloud-based computing platform, wherein the blueprint is indicative of a machine-readable representation of the one or more computing resources; and
a blockchain component that, in response to a determination that event data indicative of an event associated with the one or more computing resources satisfies a defined criterion associated with a risk level indicative of a risk to the cloud-based computing platform, adds the event data into a blockchain dataset for the cloud-based computing platform, wherein the blockchain dataset comprises a sequence of data blocks that corresponds to a sequence of events for the cloud-based computing platform.

22. The system of claim 21, wherein the learning component learns the one or more features associated with the cloud-based computing platform based on a machine learning process.

23. A computer-implemented method, comprising:
determining, by a system operatively coupled to a processor, one or more computing resources of a cloud-based computing platform based on a blueprint indicative of a machine-readable representation of the one or more computing resources;
adding, by the system, first event data indicative of a first event associated with the one or more computing resources into a first data block of a blockchain dataset for the cloud-based computing platform in response to a determination that the first event data satisfies a first defined criterion associated with a first risk level indicative of a first risk to the cloud-based computing platform; and
adding, by the system, second event data indicative of a second event associated with the one or more computing resources into a second data block of the blockchain dataset for the cloud-based computing platform in response to a determination that the second event data satisfies a second defined criterion associated with a second risk level indicative of a second risk to the cloud-based computing platform.

24. The computer-implemented method of claim 23, wherein the first risk is selected from a group consisting of a risk of computer intrusion, a risk of security breach, a risk of disaster, a risk of power outage, risk of high resource utilization, patching risk, and risk of compliance.

25. The computer-implemented method of claim 23, further comprising:
varying, by the system, a rate for adding a plurality of event data indicative of events associated with the one or more computing resources into the blockchain dataset based on the risk level.

* * * * *